ns. The synchronous

United States Patent
da Silva et al.

(10) Patent No.: US 10,313,208 B2
(45) Date of Patent: Jun. 4, 2019

(54) FLEXIBLE ASSIGNMENT OF NETWORK FUNCTIONS FOR RADIO ACCESS

(71) Applicant: Telefonaktiebolaget LM Ericsson (publ), Stockholm (SE)

(72) Inventors: Icaro L. J. da Silva, Bromma (SE); Gunnar Mildh, Sollentuna (SE); Johan Rune, Lidingö (SE); Jari Vikberg, Järna (SE); Pontus Wallentin, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 416 days.

(21) Appl. No.: 14/432,534

(22) PCT Filed: Feb. 11, 2015

(86) PCT No.: PCT/SE2015/050166
§ 371 (c)(1),
(2) Date: Mar. 31, 2015

(87) PCT Pub. No.: WO2016/099369
PCT Pub. Date: Jun. 23, 2016

(65) Prior Publication Data
US 2016/0234819 A1 Aug. 11, 2016

Related U.S. Application Data

(60) Provisional application No. 62/093,331, filed on Dec. 17, 2014.

(51) Int. Cl.
*H04L 12/24* (2006.01)
*H04W 88/06* (2009.01)
*H04W 36/00* (2009.01)

(52) U.S. Cl.
CPC ...... *H04L 41/5054* (2013.01); *H04L 41/5058* (2013.01); *H04L 41/5087* (2013.01); *H04W 36/0069* (2018.08); *H04W 88/06* (2013.01)

(58) Field of Classification Search
CPC .... H04W 72/0406; H04L 12/56; H04L 43/12; H04L 45/00; H04L 12/26; H04L 1/16; H04L 41/20; H04L 41/0893
See application file for complete search history.

(56) References Cited

U.S. PATENT DOCUMENTS 6,005,852 A    12/1999   Kokko et al.
6,236,860 B1 *   5/2001   Hagting ............ H04W 36/0085
                                                              455/436
(Continued)

FOREIGN PATENT DOCUMENTS

EP    2755429 A1   7/2014
EP    2833669 A1   2/2015
(Continued)

OTHER PUBLICATIONS

Unknown, Author, "ETSI GS NFV 002 V1.1.1", Network Functions Virtualisation (NFV); Architectural Framework, Oct. 2013, pp. 1-21.
(Continued)

*Primary Examiner* — Andrew Lai
*Assistant Examiner* — Chuong M Nguyen
(74) *Attorney, Agent, or Firm* — Patent Portfolio Builders, PLLC

(57) ABSTRACT

The disclosure relates to a method of resource allocation for supporting communications with a wireless device is provided. The method is performed in a network element of a wireless communication network. The method comprises differentiating (2710) between synchronous network functions and asynchronous network functions. The synchronous
(Continued)

and asynchronous network functions are associated with the provision of communication services to the wireless device. The synchronous network functions have requirements on processing timing which are strictly dependent on timing of a radio link used for communicating with the wireless device. The asynchronous network functions have requirements on processing timing not strictly dependent on the timing of the radio link. The method also comprises allocating (2720) resources of the wireless communication network for the instantiation of a first network function based on whether the first network function is synchronous or asynchronous.

26 Claims, 21 Drawing Sheets

(56) References Cited

U.S. PATENT DOCUMENTS

| | | | |
|---|---|---|---|
| 7,016,321 B1* | 3/2006 | Park | H04W 36/0066 370/230 |
| 7,308,023 B1* | 12/2007 | Blair | G06F 1/04 370/270 |
| 8,634,353 B2* | 1/2014 | Teague | H04L 1/1812 370/329 |
| 9,088,509 B1* | 7/2015 | Sella | H04L 45/306 |
| 2002/0105906 A1* | 8/2002 | Marjelund | H04Q 11/0478 370/229 |
| 2003/0103520 A1* | 6/2003 | Chen | H04L 47/14 370/444 |
| 2005/0147030 A1* | 7/2005 | Lenzini | H04L 12/6418 370/229 |
| 2007/0211660 A1* | 9/2007 | Teague | H04L 1/1812 370/329 |
| 2007/0258405 A1* | 11/2007 | Kim | H04W 36/0066 370/331 |
| 2008/0037470 A1* | 2/2008 | Kim | H04W 36/14 370/331 |
| 2008/0133995 A1* | 6/2008 | Lohr | H04L 1/1678 714/748 |
| 2011/0119548 A1* | 5/2011 | Imamura | H04L 1/1812 714/748 |
| 2012/0269137 A1* | 10/2012 | Kang | H04B 7/0404 370/329 |
| 2013/0262915 A1* | 10/2013 | Frank | H04L 41/0663 714/4.11 |
| 2013/0303203 A1 | 11/2013 | Wang et al. | |
| 2014/0153390 A1* | 6/2014 | Ishii | H04W 28/0289 370/230 |
| 2014/0220974 A1 | 8/2014 | Hsu | |
| 2015/0016381 A1 | 1/2015 | Kaikkonen et al. | |
| 2015/0016390 A1* | 1/2015 | McBeath | H04L 1/1822 370/329 |
| 2015/0023269 A1* | 1/2015 | Lee | H04L 1/1822 370/329 |
| 2015/0043479 A1* | 2/2015 | Kitazoe | H04W 72/044 370/329 |
| 2015/0063166 A1* | 3/2015 | Sif | G06F 9/45558 370/254 |
| 2015/0296481 A1 | 10/2015 | Yu et al. | |
| 2015/0355919 A1* | 12/2015 | Gatherer | G06F 9/455 718/1 |
| 2015/0373559 A1* | 12/2015 | Hong | H04W 52/0206 370/329 |
| 2016/0007237 A1 | 1/2016 | Yi et al. | |
| 2016/0036541 A1 | 2/2016 | Lindoff et al. | |
| 2016/0112149 A1 | 4/2016 | Kim et al. | |
| 2016/0227514 A1 | 8/2016 | Burbidge et al. | |
| 2016/0330680 A1 | 11/2016 | Yi et al. | |
| 2017/0055202 A1 | 2/2017 | Uchiyama et al. | |
| 2017/0070312 A1 | 3/2017 | Yi et al. | |

FOREIGN PATENT DOCUMENTS

| | | |
|---|---|---|
| JP | 2017534222 A | 11/2017 |
| WO | 2009158626 A1 | 12/2009 |
| WO | 2012140470 A1 | 10/2012 |
| WO | 2014021761 A2 | 2/2014 |
| WO | 2014166050 A1 | 10/2014 |
| WO | 2016074702 A1 | 5/2016 |
| WO | 2016130061 A1 | 8/2016 |

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.3.0, Sep. 2014, 1-215.
Da Silva, Icaro et al., "Tight integration of new 5G air interface and LTE to fulfill 5G requirements", IEEE, ISBN 978-1-4799-8088, 2015, 1-5.
Frenger, Pål et al., "A Clean Slate Radio Network Designed for Maximum Energy Performance", IEEE PIMRC 2014, 2014, 1-5.
Unknown, Author, "Relaxed Measurements for Inter-frequency Cell Search", 3GPP TSG-RAN WG4 Meeting #70 R4-140761, Prague, Czech Republic, Feb. 10-14, 2014, 1-5.

* cited by examiner

FLEXIBLE ASSIGNMENT OF NETWORK FUNCTIONS FOR RADIO ACCESS

TECHNICAL FIELD

The present invention generally relates to functionality in Radio Access Networks, and particularly relates to resource allocation for supporting communications with a wireless device.

BACKGROUND

Evolved Packet System (EPS), is the evolved $3^{rd}$ Generation Partnership Project (3GPP) Packet Switched Domain. EPS includes Evolved Packet Core (EPC), and Evolved Universal Terrestrial Radio Access Network (E-UTRAN). FIG. 1 shows an overview of the EPC architecture in a non-roaming context, which architecture includes a Packet Data Network (PDN) Gateway (PGW), a Serving Gateway (SGW), a Policy and Charging Rules Function (PCRF), a Mobility Management Entity (MME) and a wireless device also called a User Equipment (UE). The radio access, E-UTRAN, consists of one or more eNodeBs (eNB).

FIG. 2 shows the overall E-UTRAN architecture and includes eNBs, providing the E-UTRA user plane and control plane protocol terminations towards the UE. The user plane control terminations comprise Packet Data Convergence Protocol (PDCP), Radio Link Control (RLC), Medium Access Control (MAC), and a Physical Layer (PHY). The control plane control terminations comprise Radio Resource Control (RRC) in addition to the listed user plane control terminations. The eNBs are interconnected with each other by means of an X2 interface. The eNBs are also connected by means of the S1 interface to the EPC, more specifically to the MME by means of the S1-MME interface and to the SGW by means of the S1-U interface.

The main parts of the EPC Control Plane and User Plane architectures are shown in FIG. 3 and FIG. 4, respectively.

Long Term Evolution (LTE) Overview

LTE uses Orthogonal Frequency Division Multiplexing (OFDM) in the Downlink (DL) and Direct Fourier Transform (DFT)-spread OFDM in the Uplink (UL). The basic LTE DL physical resource can thus be seen as a time-frequency grid as illustrated in FIG. 5, where each resource element corresponds to one OFDM subcarrier during one OFDM symbol interval.

In the time domain, LTE DL transmissions are organized into radio frames of 10 ms, each radio frame consisting of ten equally-sized subframes of length $T_{frame}=1$ ms (see FIG. 6). Furthermore, the resource allocation in LTE is typically described in terms of resource blocks (RB), where a RB corresponds to one slot (0.5 ms) in the time domain and 12 contiguous subcarriers in the frequency domain. A pair of two adjacent RBs in time direction (1.0 ms) is known as a RB pair. RBs are numbered in the frequency domain, starting with 0 from one end of the system bandwidth. The notion of virtual RBs (VRB) and physical RBs (PRB), has been introduced in LTE. The actual resource allocation to a UE is made in terms of VRB pairs. There are two types of resource allocations, localized and distributed. In the localized resource allocation, a VRB pair is directly mapped to a PRB pair, hence two consecutive and localized VRB are also placed as consecutive PRBs in the frequency domain. On the other hand, the distributed VRBs are not mapped to consecutive PRBs in the frequency domain; thereby providing frequency diversity for data channel transmitted using these distributed VRBs.

DL transmissions are dynamically scheduled, i.e., in each subframe the base station transmits control information about to which terminals data is transmitted and upon which RBs the data is transmitted in the current DL subframe. This control signaling is typically transmitted in the first 1, 2, 3 or 4 OFDM symbols in each subframe and the number n=1, 2, 3 or 4 is known as the Control Format Indicator (CFI). The DL subframe also contains Common Reference Symbols (CRS) which are known to the receiver and used for coherent demodulation of, e.g., the control information. A DL system with CFI=3 is illustrated in FIG. 7.

LTE Control and User Diane Architecture

Conventional control and user plane protocol architectures highlighting the radio interface on the eNB-side are shown in FIGS. 8a and 8b. The control and user plane consists of the following protocol layers and main functionality:

Radio Resource Control, RRC (control plane only)
  Broadcast of system information for both Non-access stratum (NAS) and Access stratum (AS)
  Paging
  RRC connection handling
  Allocation of temporary identifiers for the UE
  Configuration of signaling radio bearer(s) for RRC connection
  Handling of radio bearers
  QoS management functions
  Security functions including key management
  Mobility functions including:
    UE measurement reporting and control of the reporting
    Handover
    UE cell selection and reselection and control of cell selection and reselection
  NAS direct message transfer to/from the UE Packet Data Convergence Protocol, PDCP
  There exists one PDCP entity for each radio bearer for the UE. PDCP is used for both control plane (RRC) and for user plane
  Control plane main functions, including ciphering/deciphering and integrity protection
  User Plane main functions, including ciphering/deciphering, header compression and decompression using Robust Header Compression (ROHC), and in-sequence delivery, duplicate detection and retransmission (mainly used during handover)

Radio Link Control, RLC
  The RLC layer provides services for the PDCP layer and there exists one RLC entity for each radio bearer for the UE
  Main functions for both control and user plane include segmentation or concatenation, retransmission handling (using Automatic Repeat Request (ARQ), duplicate detection and in-sequence delivery to higher layers.

Medium Access Control, MAC
  The MAC provides services to the RLC layer in the form of logical channels, and performs mapping between these logical channels and transport channels
  Main functions are: UL and DL scheduling, scheduling information reporting, hybrid-ARQ retransmissions and multiplexing/demultiplexing data across multiple component carriers for carrier aggregation Physical Layer, PHY The PHY provides services to the MAC layer in the form of transport channels and handles mapping of transport channels to physical channels.

Main functions for DL performed by the eNB (OFDM) are:

Sending of DL reference signals

Detailed steps (from "top to down"): CRC insertion; code block segmentation and per-code-block CRC insertion; channel coding (Turbo coding); rate matching and physical-layer hybrid-ARQ processing; bit-level scrambling; data modulation (QPSK, 16QAM, or 64QAM); antenna mapping and multi-antenna processing; OFDM processing, including Inverse Fast Fourier Transform (IFFT), and Cyclic Prefix (CP) insertion resulting in time domain data sometimes referred to as IQ data or digitalized Radio Frequency (RF) data); digital-to-analog conversion; power amplifier; and sending to antenna.

Main functions for UL performed by the eNB (DFT-spread OFDM) are:

Random access support

Detailed steps (from "top to down"): CRC removal, code block de-segmentation, channel decoding, rate matching and physical-layer hybrid-ARQ processing; bit-level descrambling; data demodulation; Inverse Discrete Fourier Transform (IDFT); antenna mapping and multi-antenna processing; OFDM processing, including Fast Fourier Transform (FFT) and CP removal; Analog-to-Digital conversion; power amplifier; and receiving from antenna.

The described eNB functionality can be deployed in different ways. In one example, all the protocol layers and related functionality are deployed in the same physical node, including the antenna. One example of this is a pico or femto eNodeB. Another deployment example is a so called Main-Remote split. In this case, the eNodeB is divided into a Main Unit and a Remote Unit that are also called Digital Unit (DU) and Remote Radio Unit (RRU) respectively. The Main Unit or DU contains all the protocol layers, except the lower parts of the PHY layer that are instead placed in the Remote Unit or RRU. The split in the PHY-layer is at the time domain data level (IQ data, i.e. after/before IFFT/FFT and CP insertion/removal). The IQ data is forwarded from the Main Unit to the Remote Unit over a so called Common Public Radio Interface (CPRI)—which is a high speed, low latency data interface. The Remote Unit then performs the needed Digital-to-Analog conversion to create analog RF-data, power amplifies the analog RF-data and forwards the analog RF data to the antenna. In still another deployment option, the RRU and the antenna are co-located, creating a so called Antenna Integrated Radio (AIR).

Carrier Aggregation

The LTE Rel-10 specifications have been standardized, supporting Component Carrier (CC) bandwidths up to 20 MHz, which is the maximal LTE Rel-8 carrier bandwidth. An LTE Rel-10 operation wider than 20 MHz is possible and appear as a number of LTE CCs to an LTE Rel-10 terminal. The straightforward way to obtain bandwidths wider than 20 MHz is by means of Carrier Aggregation (CA). CA implies that an LTE Rel-10 terminal can receive multiple CCs, where the CCs have or at least have the possibility to have, the same structure as a Rel-8 carrier. CA is illustrated in FIG. 9. The Rel-10 standard support up to five aggregated CCs, where each CC is limited in the RF specifications to have one of six bandwidths, namely 6, 15, 25, 50, 75 or 100 RB corresponding to 1.4, 3, 5, 10, 15, and 20 MHz respectively. The number of aggregated CCs as well as the bandwidth of the individual CCs may be different for UL and DL. A symmetric configuration refers to the case where the number of CCs in DL and UL is the same whereas an asymmetric configuration refers to the case that the number of CCs is different in DL and UL. It is important to note that the number of CCs configured in the network may be different from the number of CCs seen by a terminal. A terminal may for example support more DL CCs than UL CCs, even though the network offers the same number of UL and DL CCs.

CCs are also referred to as cells or serving cells. More specifically, in an LTE network, the cells aggregated by a terminal are denoted primary Serving Cell (PCell), and secondary Serving Cell (SCell). The term serving cell comprises both PCell and one or more SCells. All UEs have one PCell. Which cell is a UE's PCell is terminal specific and is considered "more important", i.e., vital control signaling and other important signaling is typically handled via the PCell. UL control signaling is always sent on a UE's PCell. The component carrier configured as the PCell is the primary CC whereas all other CCs are SCells. The UE can send and receive data both on the PCell and SCells. For control signaling such as scheduling commands this could either be configured to only be transmitted and received on the PCell. However, the commands are also valid for SCell, and the commands can be configured to be transmitted and received on both PCell and SCells. Regardless of the mode of operation, the UE will only need to read the broadcast channel in order to acquire system information parameters on the Primary Component Carrier (PCC). System information related to the Secondary Component Carrier(s) (SCC), may be provided to the UE in dedicated RRC messages. During initial access, an LTE Rel-10 terminal behaves similar to a LTE Rel-8 terminal. However, upon successful connection to the network, a Rel-10 terminal may—depending on its own capabilities and the network—be configured with additional serving cells in the UL and DL. Configuration is based on RRC. Due to the heavy signaling and rather slow speed of RRC signaling, it is envisioned that a terminal may be configured with multiple serving cells even though not all of them are currently used. In summary, LTE CA supports efficient use of multiple carriers, allowing data to be sent and received over all carriers. Cross-carrier scheduling is supported, avoiding the need for the UE to listen to all carrier-scheduling channels all the time. A solution relies on tight time synchronization between the carriers.

LTE Rel-12 Dual Connectivity

Dual connectivity is a solution currently being standardized by 3GPP to support UEs connecting to multiple carriers to send and receive data on multiple carriers at the same time. The following is an overview description of Dual Connectivity (DC) based on the 3GPP standard. E-UTRAN supports DC operation, whereby a UE with multiple receivers and transmitters, which is in RRC_CONNECTED mode, is configured to utilize radio resources provided by two distinct schedulers, located in two eNBs interconnected via a non-ideal backhaul over the X2. eNBs involved in DC for a certain UE may assume two different roles. An eNB may either act as a Master eNB (MeNB), or as a Secondary eNB (SeNB). In DC, a UE is connected to one MeNB and one SeNB. The radio protocol architecture that a particular bearer uses depends on how the bearer is setup. Three alternatives exist: Master Cell Group (MCG) bearer, Secondary Cell Group (SCG) bearer, and split bearer. Those three alternatives are depicted in FIG. 10. Signal Radio Bearers (SRBs) are always of the MCG bearer and therefore only use the radio resources provided by the MeNB. Note that DC can also be described as having at least one bearer configured to use radio resources provided by the SeNB.

Inter-eNB control plane signaling for DC is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells. Coordination between MeNB and SeNB is performed by means of X2 interface signaling. FIG. 11 shows Control Plane (C-plane) connectivity of eNBs involved in dual connectivity for a certain UE. The MeNB is C-plane connected to the MME via S1-MME, the MeNB and the SeNB are interconnected via X2-C. FIG. 12 shows User Plane (U-plane) connectivity of eNBs involved in DC for a certain UE. U-plane connectivity depends on the bearer option configured. For MCG bearers, the MeNB is U-plane connected to the S-GW via S1-U, and the SeNB is not involved in the transport of user plane data. For split bearers, the MeNB is U-plane connected to the S-GW via S1-U and in addition, the MeNB and the SeNB are interconnected via X2-U. For SCG bearers, the SeNB is directly connected with the S-GW via S1-U.

Centralization of Radio Access Network (E-UTRAN) Functionality

Possible future evolution of the current Radio Access Network (RAN) architecture has been discussed. From a starting point in a macro site based topology, introduction of low power cells, an evolution of the transport network between different radio base station sites, a radio base station hardware evolution, and an increased need for processing power to give some examples, have given rise to new challenges and opportunities. Several strategies are proposed for the RAN architecture, pulling in sometimes different directions. Some strategies, like the gains of coordination, hardware pooling gains, energy saving gains and the evolution of the backhaul/fronthaul network, are working in favor of a more centralized deployment. At the same time, other strategies are working towards de-centralization, such as very low latency requirements for some 5G use cases, e.g., mission critical Machine Type Communication (MTC) applications. The terms fronthaul and backhaul are used in relation to the base station. The traditional definition for fronthaul is the CPRI based fiber link between the baseband Main Unit and the Remote Unit. The backhaul refers to the transport network used for S1/X2-interfaces.

The recent evolution in backhaul/fronthaul technologies has indeed opened up the possibility to centralize the baseband, often referred to as C-RAN. C-RAN is a term that can be interpreted in different ways. For some it means a "baseband hotel" like solutions in which the basebands from many sites are collocated to a central site, although there is no tight connection and fast exchange of data between the units. The most common interpretation of C-RAN is maybe "Centralized RAN" where there is at least some kind of coordination between the basebands. A potentially attractive solution is the smaller centralized RAN that is based on a macro base station and the lower power nodes covered by it. In such a configuration, a tight coordination between the macro and the low power nodes can often give considerable gains. The term "Coordinated RAN" is an often used interpretation of C-RAN that focuses on the coordination gains of the centralization. Other more futuristic interpretations of C-RAN include "cloud" based and "virtualized" RAN solutions where the radio network functionality is supported on generic hardware such as general purpose processors, and possibly as virtual machines.

A centralized deployment can be driven by one or several forces like, e.g., a possible ease of maintenance, upgrade and less need for sites, as well as harvesting of coordination gains. A common misconception is that there is a large pooling gain and a corresponding hardware saving to be done by the centralization. The pooling gain is large over the first number of pooled cells but then diminishes quickly. One key advantage of having the basebands from a larger number of sites co-located and interconnected is the tight coordination that it allows. Examples of these are UL Coordinated Multi-Point (CoMP), and a combining of several sectors and/or carriers into one cell. The gains of these features can sometimes be significant in relation to the gains of looser coordination schemes such as, e.g., enhanced inter-cell interference coordination (eICIC) that can be done over standard interfaces (X2) without co-location of the baseband.

An attractive C-RAN deployment from a coordination gain perspective is the C-RAN built around a larger macro site, normally with several frequency bands, and a number of lower power radios, covered by the macro site, that are tightly integrated into the macro over high-speed interconnect. The largest gains are expected to be seen in deployment scenarios such as for stadiums and malls. An important consideration for any C-RAN deployment is the transport over the fronthaul, i.e., the connection between the centralized baseband part and the radios, sometimes referred to as "the first mile". The cost of the fronthaul, which vary rather greatly between markets, needs to be balanced against the benefits.

Problems

Ongoing discussions in the wireless industry in different for a seem to move towards a direction where the functional architecture of the 5G radio access network should be designed flexibly enough to be deployed in different hardware platforms and possibly in different sites in the network. In this way some benefits from centralization could be achieved such as: i) potential gains from coordination features (e.g. interference cancellation, CoMP); ii) more efficient usage of hardware resources; iii) potential energy savings by centralization of the baseband hardware; iv) possible ease of maintenance upgrade and less need for sites. On the other hand, it is recognized herein that there has not yet been proposed a solution to enable such a flexible functional architecture for 5G RAN.

The functional architectures of current RANs, such as the ones of LTE, Universal Mobile Telephony System (UMTS), and Global System for Mobile communication (GSM), have been mainly designed for specific deployment scenarios. Therefore the functional architectures are rather fixed. In LTE which has a rather distributed RAN, different functions of the protocol stack are assumed to have instances running in the same physical node, i.e. in the eNodeB, so that strong timing and synchronicity dependencies between these functions is not perceived as potential constraints for different deployments. Another reason for a rather fixed functional architecture in currently deployed RANs is that the RANs have been designed to provide services with similar requirements to a large extent. As one example, LTE was designed to support Mobile Broadband services with high data rates and lower latency compared to UMTS. However, it is also part of the current ambition for 5G RAN to address a much wider range of services such as Extreme Mobile broadband, Ultra-reliable, as well as mission critical and massive MTC. Under these new assumptions, scalability becomes a more complex challenge due to a wider variety of terminal or wireless device types generating a variety of quite different traffic and signaling types, and having different mobility assumptions in a heterogeneous environment.

It is also assumed that optimized designs will lead to a 5G RAN with multiple air interface variants. It is further recognized herein that the ambitious 5G requirements, the diversity of frequency bands and the advantages of interworking with legacy systems may require a tighter integration between the multiple 5G air interfaces and the legacy ones, beyond the interworking that exists today. Such tighter integration aims to extend multi-link integration concepts studied and standardized in 3GPP to the multiple air-interfaces such as DC. Thereby, completely new challenges may be envisioned assuming the specificities of each air interface, e.g. different frequency bands and time-frame structure. Also, integration features are typically designed to be specific to a Radio Access Technology (RAT). To give an example, the current CA and DC only provide "intra-LTE" functionality, i.e., functionality that can be used for example between different LTE carriers. Meanwhile, the existing multi-RAT features are not integration features, but rather interworking features designed for different levels, e.g., common subscription, and common core network, or features enabling some coordination via RAN inter-node interfaces for load balancing or coverage-based handover purposes.

It is thus recognized herein that the existing functional architectures of RANs are rather fixed, and that the current approaches to design them are not suitable to solve the scalability challenge inherent from the requirements that are to be addressed by 5G RAN.

SUMMARY

An object may be to alleviate or at least reduce one or more of the above mentioned problems. This object and others are achieved by the method and the network element according to the independent claims, and by the embodiments according to the dependent claims.

According to a first aspect, a method of resource allocation for supporting communications with a wireless device is provided. The method is performed in a network element of a wireless communication network. The method comprises differentiating between synchronous network functions and asynchronous network functions. The synchronous and asynchronous network functions are associated with the provision of communication services to the wireless device. The synchronous network functions have requirements on processing timing which are strictly dependent on timing of a radio link used for communicating with the wireless device. The asynchronous network functions have requirements on processing timing not strictly dependent on the timing of the radio link. The method also comprises allocating resources of the wireless communication network for the instantiation of a first network function based on whether the first network function is synchronous or asynchronous.

According to a second aspect, a network element for a wireless communication network is provided. The network element is configured to allocate resources for supporting communications with a wireless device. The network element is further configured to differentiate between synchronous network functions and asynchronous network functions. The synchronous and asynchronous network functions are associated with the provision of communication services to the wireless device. The synchronous network functions have requirements on processing timing which are strictly dependent on timing of a radio link used for communicating with the wireless device. The asynchronous network functions have requirements on processing timing not strictly dependent on the timing of the radio link. The network element is also configured to allocate resources of the wireless communication network for the instantiation of a first network function based on whether the first network function is synchronous or asynchronous.

According to further aspects, the object is achieved by a computer program and a computer program product corresponding to the aspects above.

One advantage of a resource allocation according to embodiments of the invention based on the differentiating between synchronous and asynchronous network functions is that it enables flexible functional deployments for the asynchronous functions while still fulfilling the requirements on processing timing of the synchronous functions.

BRIEF DESCRIPTION OF THE DRAWINGS

The various aspects of embodiments disclosed herein, including particular features and advantages thereof, will be readily understood from the following detailed description and the accompanying drawings.

DETAILED DESCRIPTION

Figure 13:
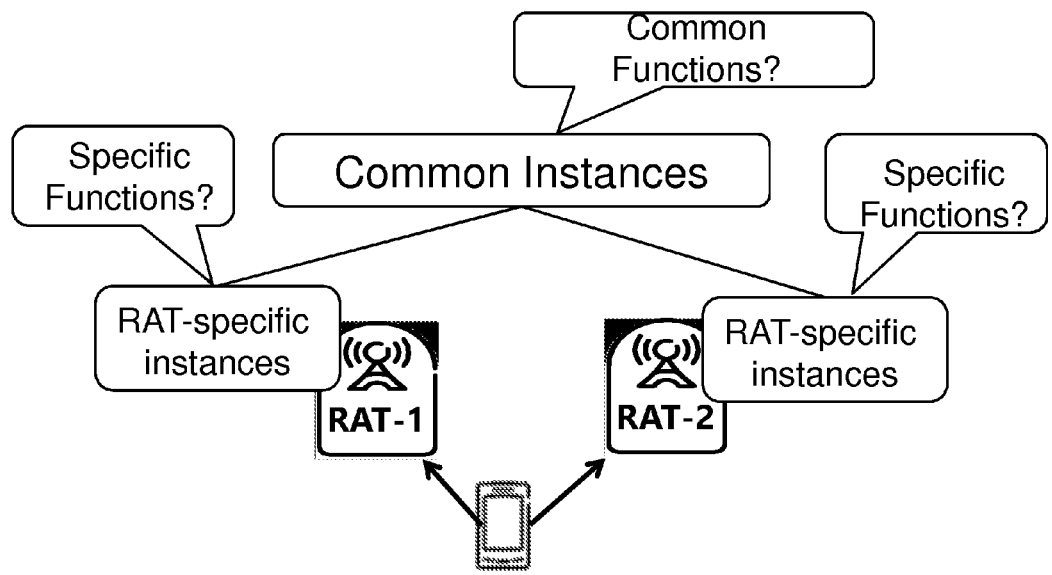
FIG. 13 schematically illustrates problems for functional split and multi-RAT integration.

The embodiments described herein enable flexible functional architectures for the 5G RAN, including extending the flexible 5G RAN to be an integrated multi-RAT functional architecture. As illustrated in FIG. 13, one problem to solve is to determine which functions associated with the provision of communication services to wireless devices that should be RAT-specific and which functions that should be common in an integrated multi-RAT architecture. Another problem is to determine how these common and specific functions should be allocated in the network. As illustrated in FIG. 13, common functions may be allocated in common instances, and RAT-specific functions may be allocated in RAT-specific instances, such as a base station of a specific RAT. The problem illustrated in FIG. 13 is addressed in embodiments described herein.

Figure 14:
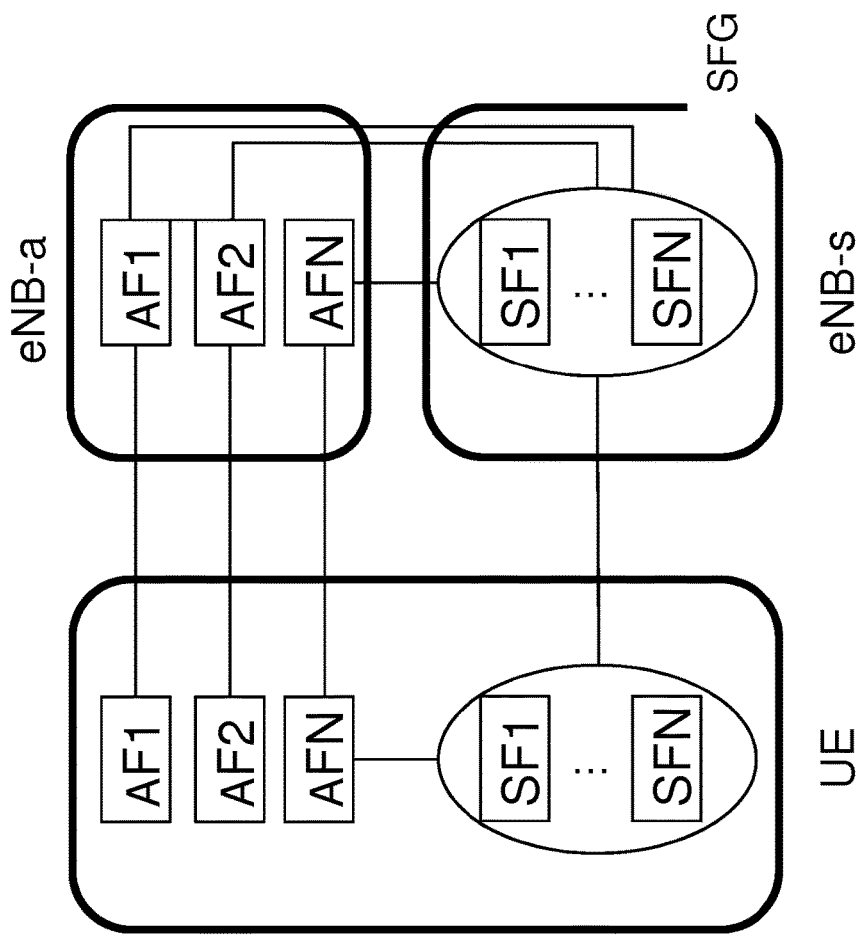
FIG. 14 schematically illustrates a concept of grouping asynchronous and synchronous functions, according to various embodiments.

A method embodiment is described as performing flexible network function instantiation in different scenarios where a wireless device tries to access the radio network, such as during mobility procedures, initial access, and connected state transition. The method relies on a logical split of the radio base station functions in asynchronous functions with loose timing constraints, and Synchronous Function Groups (SFGs), typically executing time critical functionality. The logical network elements running these functions can respectively be called s-eNodeB (s-eNB or eNB-s) and a-eNodeB (a-eNB or eNB-a) in the case of LTE, or s-5G-eNB and a-5G-eNB in the case of 5G. This logical split is shown in FIG. 14. On the eNB side, functions SF1 to SFN are synchronous functions belonging to an SFG and therefore allocated at the network element eNB-s, and functions AF1, AF2 and AFN are asynchronous functions allocated at the network element eNB-a. The correspondence of the functions in the wireless device or UE illustrates that the functions are associated with the provision of communication services to wireless device.

As described above, asynchronous functions are functions with loose timing constraints, and synchronous functions are typically executing time critical functionality. The synchronous network functions have requirements on processing timing which are strictly dependent on timing of a radio link used for communicating with the wireless device. The asynchronous network functions have requirements on processing timing not strictly dependent on the timing of the radio link, or even independent on the timing of the radio link.

Furthermore, an instantiation of a network function may refer to the action of making the software code for the function ready for execution. This may involve deploying the actual code—unless it has already been deployed—and allocating necessary hardware and/or software resources at a virtual or physical (non-virtual) execution platform, data center and/or location. The allocated resources may e.g. include processing resources, memory, a virtual machine, and/or functionally dedicated circuitry.

One embodiment of the method comprises a fixed instantiation of, and thus allocation of resources for, the SFGs associated to a given wireless device at the network nodes or elements that are physically deployed closest to the air interface, when a wireless device tries to access the network. Such a node can be an RBS such as an eNB. Later it is explained in details how the functions are classified as belonging to an SFG.

Another embodiment of the method comprises a flexible instantiation of, and allocation of resources for, asynchronous functions, where the instantiation occurs either at the RBS or in at least one of the physically deployed Fixed Network Nodes (FNNs) that are placed in different network sites. An FNN can be placed in a Hub site, an Access site, an Aggregation site, a Local Switching site, a telecom regional data center, or a national data center. This flexible instantiation may be done assuming that the selected node (RBS or FNN) will have available resources to instantiate these functions. The available resources may be hardware resources, software resources, and transport network resources. The transport network resources may in the case of instantiation at an FNN for example be resources at the transport network between the FNN and the RBS. This flexible instantiation of the asynchronous functions is performed by a logical network element that has access to the relevant information in order to take an educated decision about where the asynchronous functions should be instantiated, i.e. in which node. The relevant information for taking the decision may be obtained e.g. via application programming interfaces or via some sort of signaling throughout the network. This logical network element may be called a Network Function Orchestrator (NFO).

In one embodiment of the method, the concept is extended to multiple air interfaces or air interface variants, or to multiple RATs. For the same wireless device, the SFGs may have instances associated to each air interface. In one example, the SFGs may have instances for LTE-compatible and for non-LTE-compatible parts of the 5G access. On the other hand, the instances of the asynchronous functions may be common for the multiple air interfaces.

Differentiating Between Synchronous and Asynchronous Network Functions

A method embodiment defines a new split of the RAN functionalities, e.g. eNB or 5G-eNB RAN functionality. The RAN functionality may be split into asynchronous network functions (called "eNB-a") and synchronous network functions (called "eNB-s"). The method comprises the possibility to flexibly deploy these network functions or network function groups on different network sites with relatively low requirements on the fronthaul transport network between the network sites. It should be noted that co-siting of eNB-s and eNB-a is also supported. Furthermore, the instances of the asynchronous functions may be used from two or more radio accesses at the same time. This includes both the case when the radio accesses are part of the same RAT, e.g. two LTE RATs, or when the radio accesses used are part of different RATs, e.g. one LTE RAT and one 5G RAT. It should also be noted that the terms "eNB-a" and "eNB-s" are used to indicate single, multiple, different or separate instances of such functions or function groups.

Figure 1:
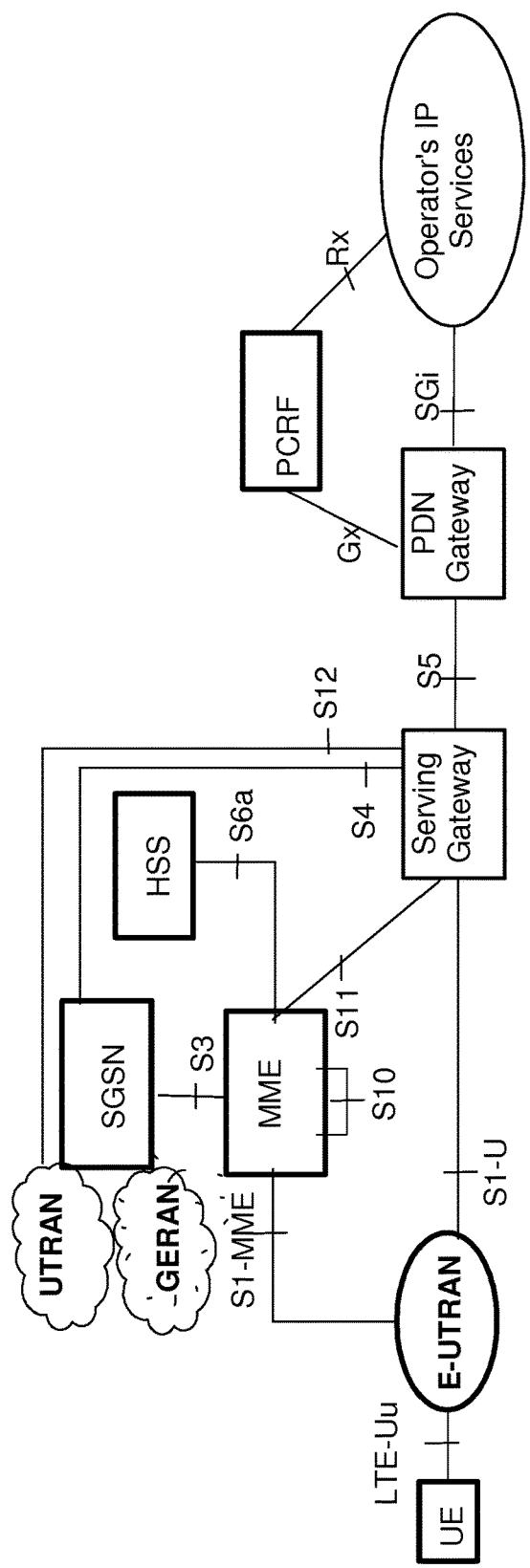
FIG. 1 is a block diagram schematically illustrating a non-roaming EPC architecture for 3GPP accesses.
Figure 2:
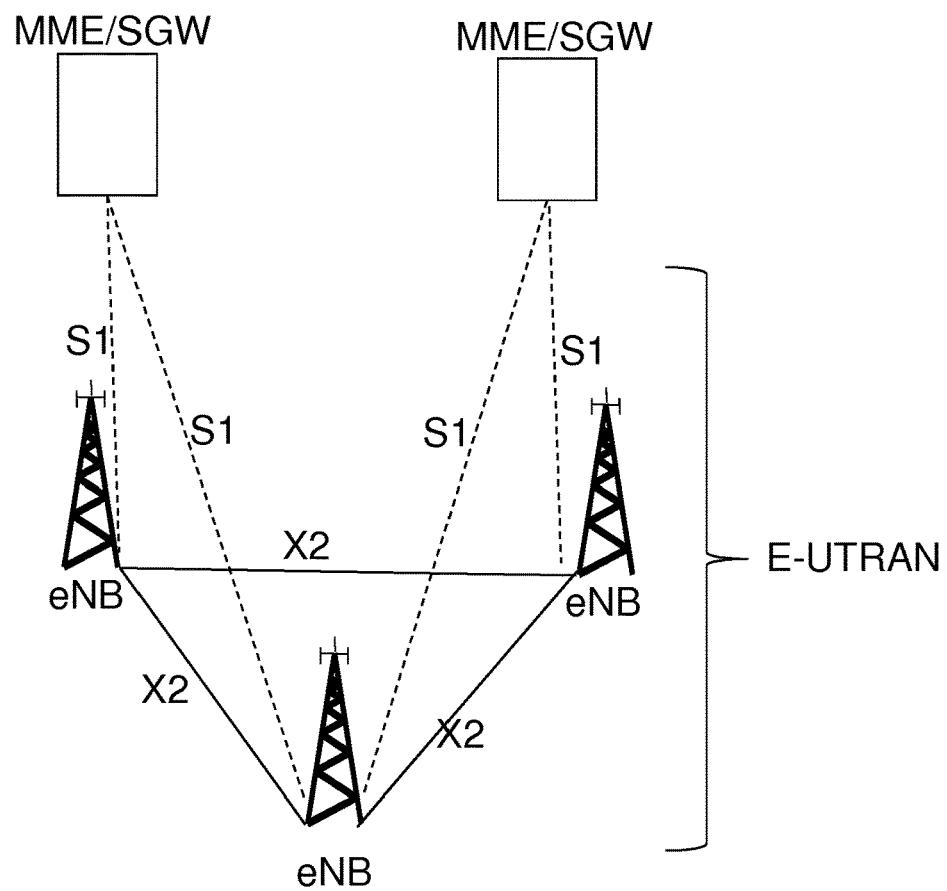
FIG. 2 is a block diagram schematically illustrating an E-UTRAN overall architecture.
Figure 9:
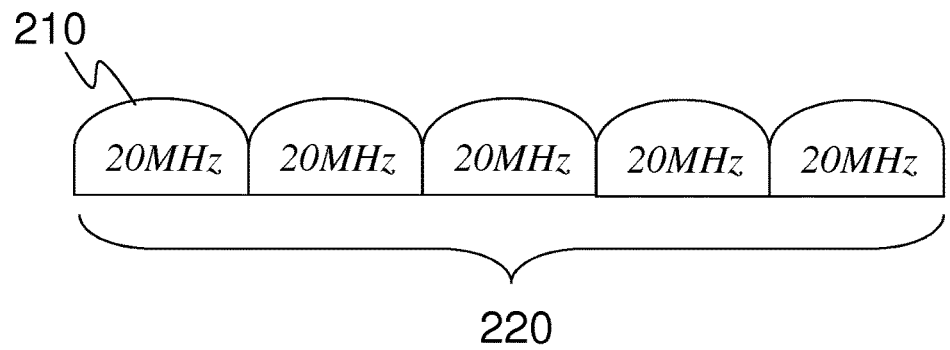
FIG. 9 schematically illustrates CA of five CC.
Figure 3:
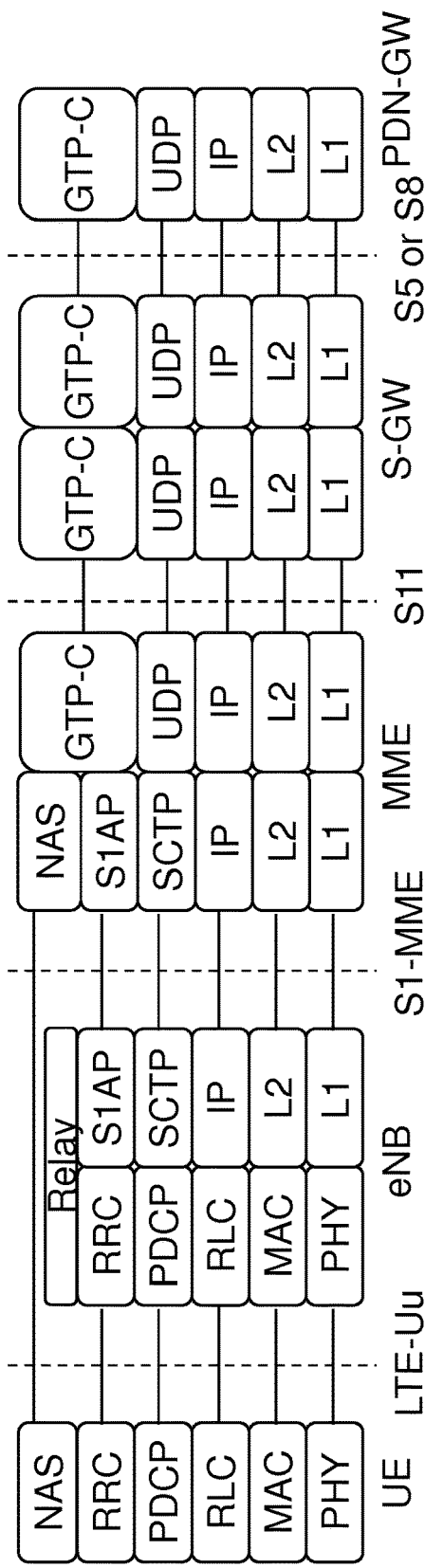
FIG. 3 schematically illustrates an EPC Control Plane protocol architecture.
Figure 4:
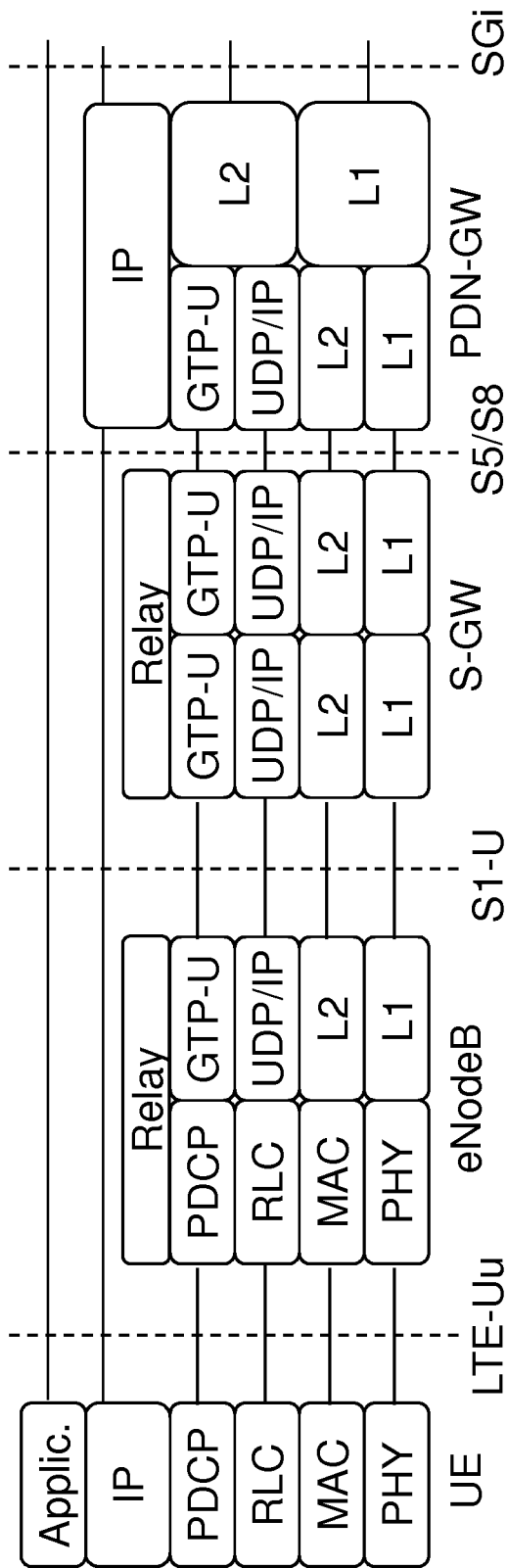
FIG. 4 schematically illustrates an EPC User Plane protocol architecture.
Figure 5:
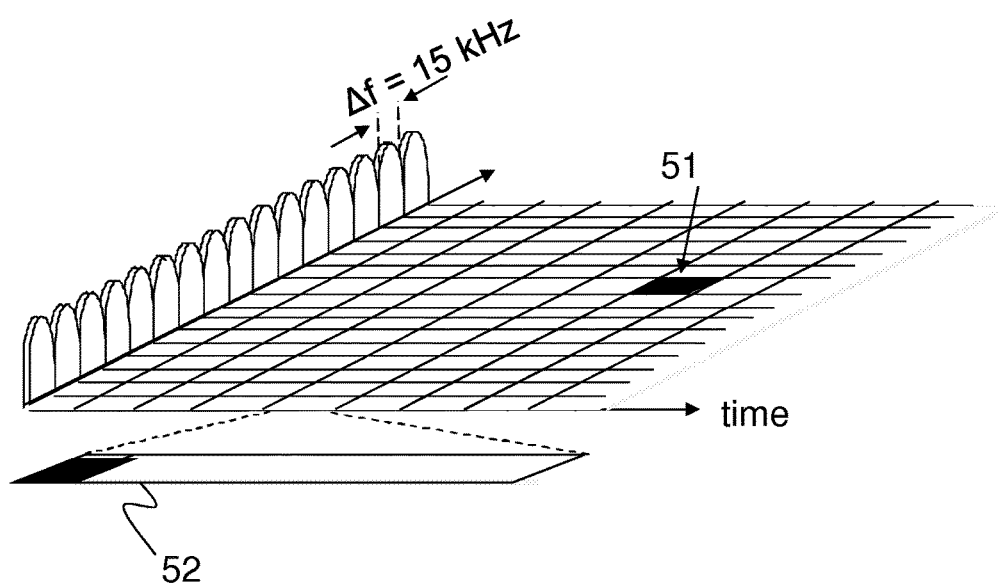
FIG. 5 schematically illustrates the basic LTE DL physical resource.
Figure 6:
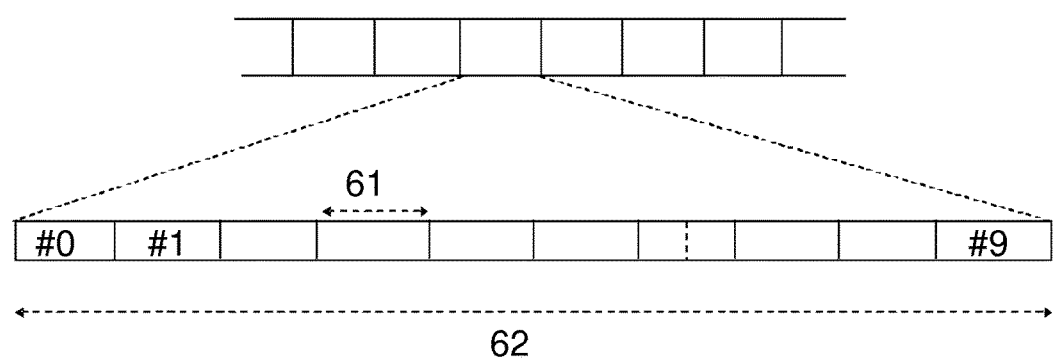
FIG. 6 schematically illustrates an LTE time-domain structure.
Figure 7:
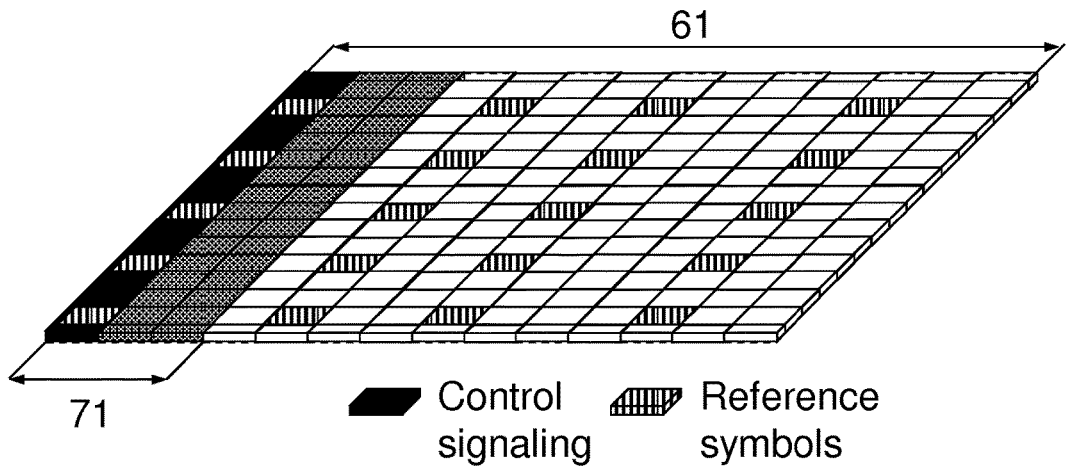
FIG. 7 schematically illustrates a DL subframe.
Figure 8A:
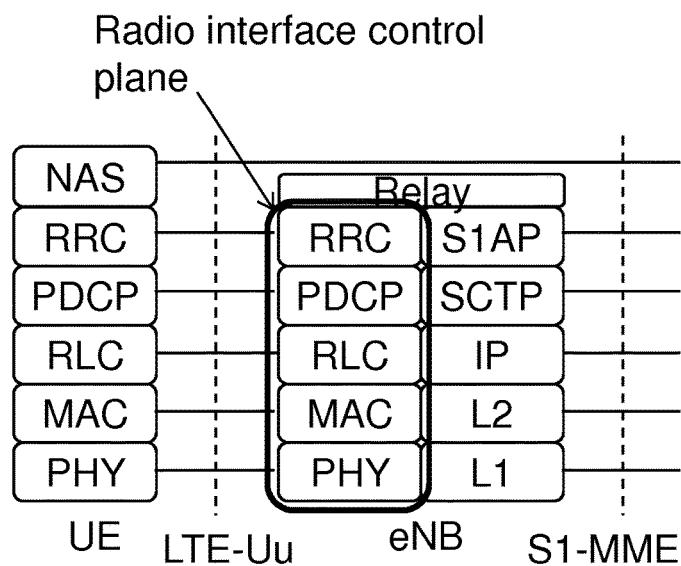
FIGS. 8a and 8b schematically illustrate control and user plane protocol layers for a conventional eNB radio interface.
Figure 8B:
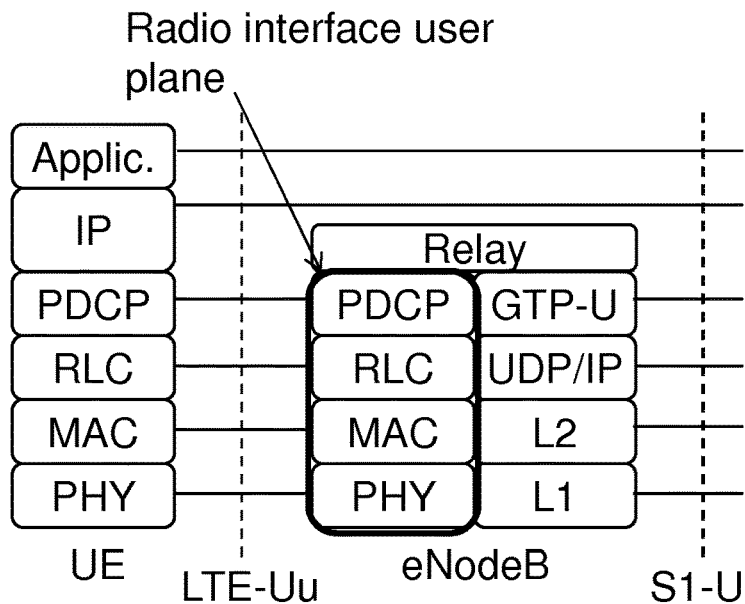
Figure 11:
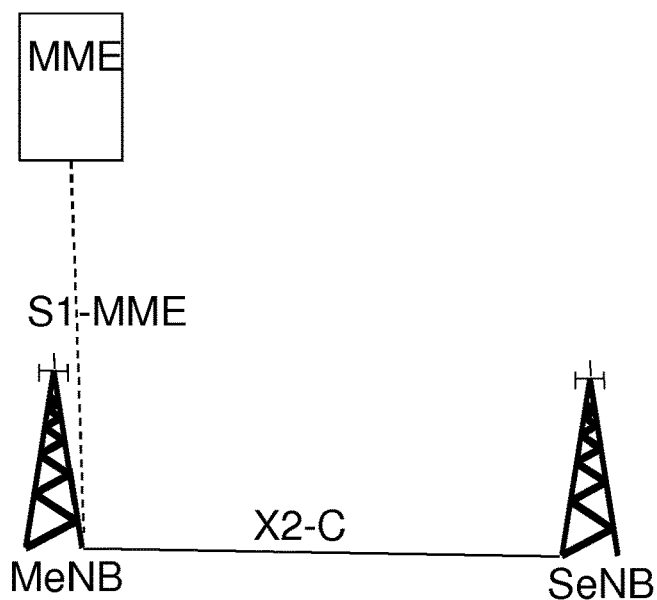
FIG. 11 is a block diagram schematically illustrating C-Plane connectivity of eNBs involved in dual connectivity.
Figure 10:
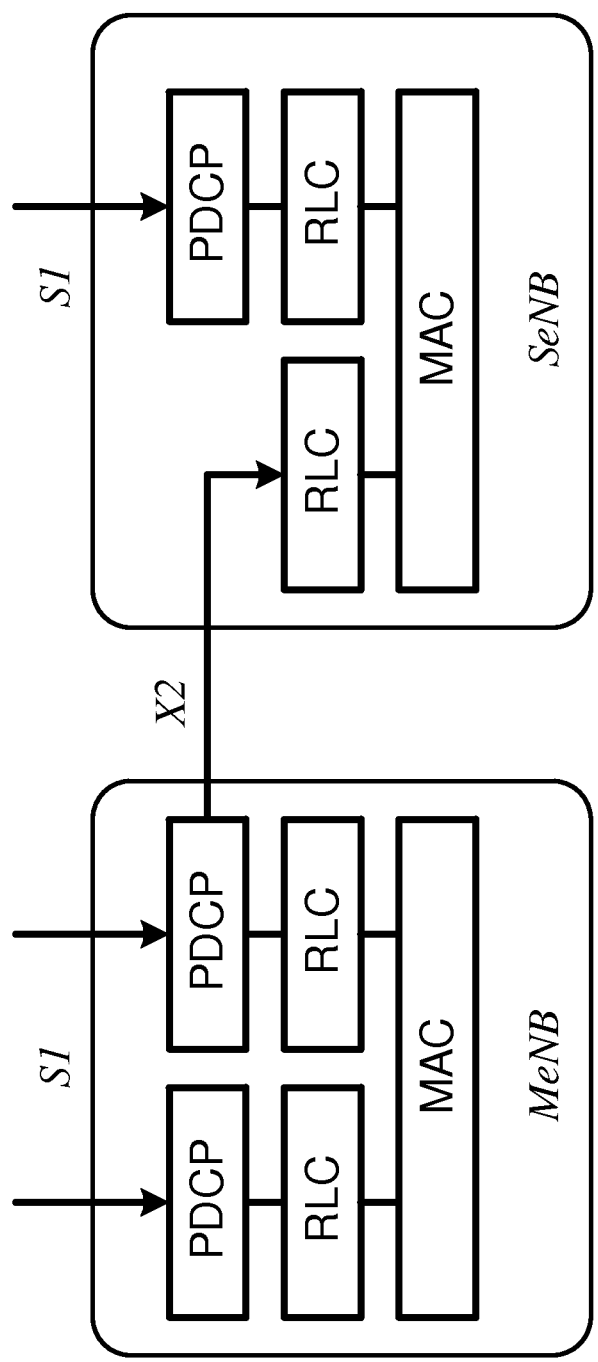
FIG. 10 schematically illustrates a Radio Protocol Architecture for Dual Connectivity.
Figure 12:
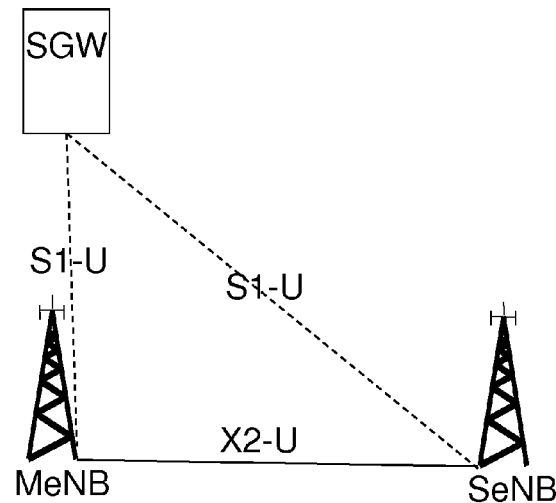
FIG. 12 is a block diagram schematically illustrating U-Plane connectivity of eNBs involved in dual connectivity.
Figure 15:
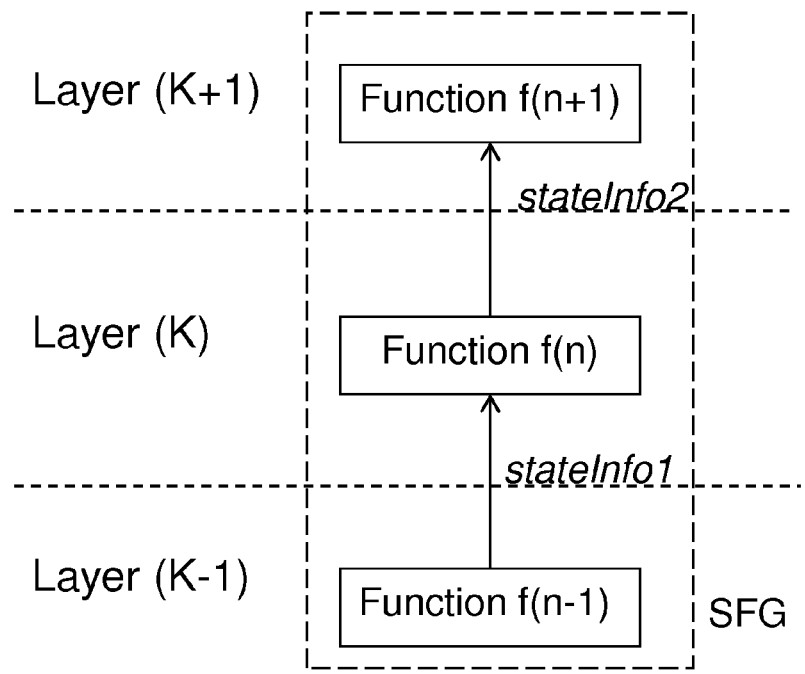
FIG. 15 schematically illustrates grouping into a Synchronous Function Group (SFG), according to various embodiments.

In embodiments, RAN functions running at the network side are organized in pairs and classified in synchronous or asynchronous pairs. A synchronous functional pair composed by functions f(n−1) and f(n) may be a pair of functions whose Service Data Unit (SDU) processing by f(n) depends on a state information from f(n−1). The state information is only valid within a given time window tSynchWindow associated to the time-domain structure of the air interface. Examples of time domain structures are: radio frames, sub-frames, Transmission Time Intervals (TTI), time-slots, symbols, or any other multiple or integer fragments defined by the air interface. FIG. 6 illustrates some examples of time domain structures for the E-UTRAN air interface. The function pairs can be extended to larger groups when the dependencies extend to other functions based on the same or other state information. For example, if another function f(n+1) has to process its SDUs based on state information produced by f(n), the functions f(n−1), f(n), f(n+1) form a SFG, as illustrated in FIG. 15. The functions f(n−1), f(n), and f(n+1) correspond to a respective protocol layer, Layer (K−1), Layer(K), and Layer (K+1). The state information stateInfo1 from function f(n−1) is valid during the time window tSynchWindow. Therefore, function f(n) processing and the exposure of state information stateInfo2 has to be executed within the time when stateInfo1 is valid. Based on the classification, functions belonging to the same SFGs may be deployed in the same node.

Figure 16:
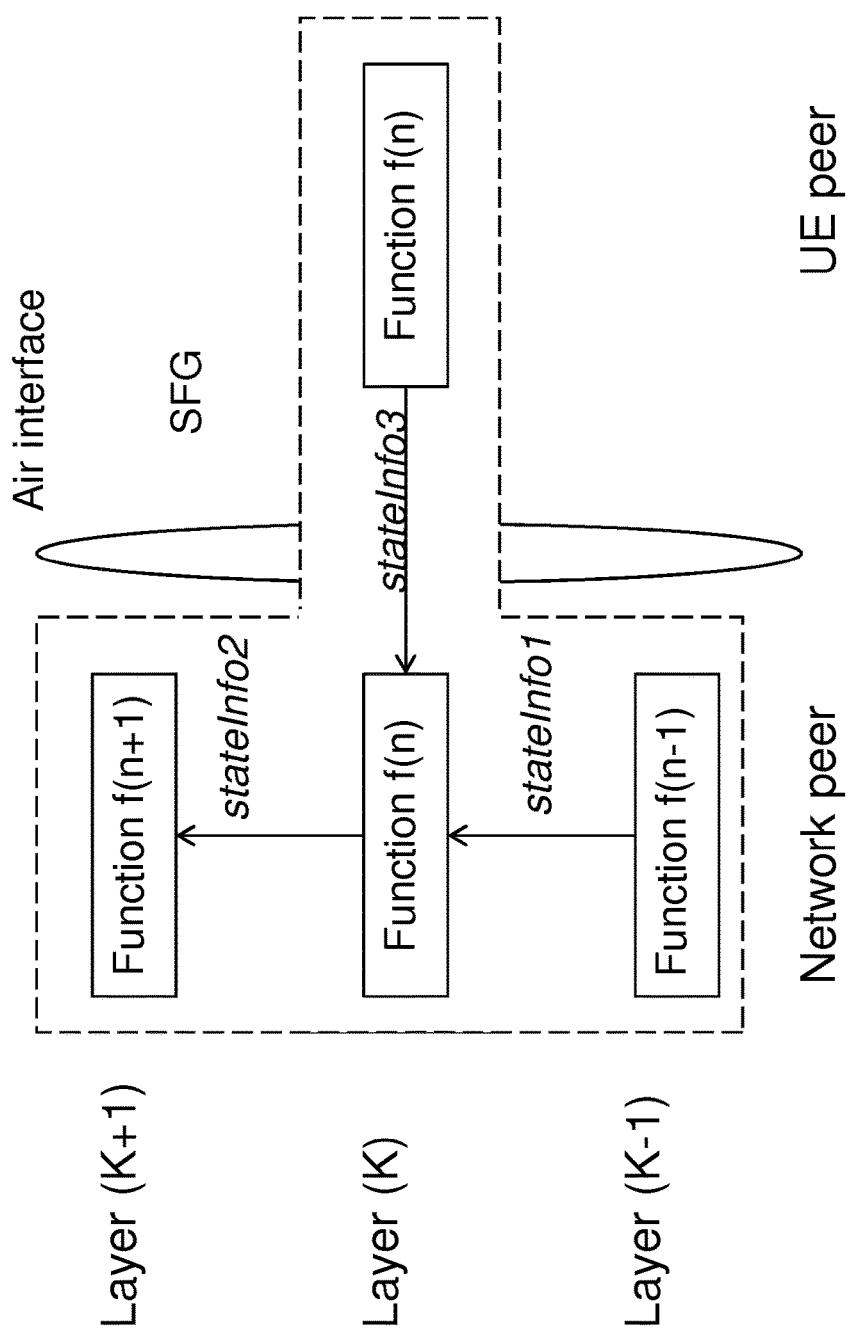
FIG. 16 schematically illustrates an SFG comprising peer functions are the UE side, according to various embodiments.

In one example embodiment, the following three network functions form an SFG in LTE: "radio resources scheduling at DL" placed at the MAC layer, "channel status information (CSI) handling or reception" at the PHY layer, and SDUs fragmentation/reassembly at the RLC layer. The CSI reports at PHY layer have to be informed to the scheduler at MAC, so that it can decide which resource blocks to allocate to a given UE for the next TTI. Once this processing is done, the scheduler has to inform the fragmentation/reassembly function at RLC in order to fit the RLC Physical Data Units (PDUs) to the amount of allocated resources. This transfer of state information has to occur within a time window tSynchWindow associated to an LTE TTI (1 ms). Otherwise the state information is not valid anymore. Therefore, these three network functions form an SFG. In another embodiment, the definition of an SFG is extended so that the UE peer of a given function is part of an SFG, if the processing of function f(n) SDUs at the network peer depends on a state information coming from its UE peer, and if this processing has to be executed within tSynchWindow associated to a time-domain structure of the air interface. In that case, the SFG functions not only have to be deployed at the same node. The node also has to be close to the UE air interface. This is illustrated in FIG. 16, where the state information from the UE, stateInfo3, is added to the scenario in FIG. 15. Therefore, in this scenario, the SFGs are instantiated at the same node and close to the air interface.

An asynchronous RAN function g(n) at the network side is defined as a function whose SDU processing depends on a state information produced by another function g(n−1), where the state information is not strictly valid under any time window tSynchWindow associated to the time-domain structure of each specific air interface. Alternatively, the SDU processing of the function g(n) does not depend on any state information from g(n−1) at all. The function g(n−1) may belong to a SFG. Asynchronous functional pairs can be defined, and they have the flexibility to be placed in different logical nodes connected via an inter-node interface. If in addition to this, the asynchronous function at the network side does not depend on time critical information from its UE peer to execute any SDU processing, the function has the flexibility to be deployed further away from the air interface as well. Therefore, asynchronous functions can be flexibly placed either at the same physical node as SFGs, i.e., typically close to the air interface or further away. In one example an asynchronous function or function pair may be placed or instantiated in one of the FNNs.

Criteria for Deciding where to Allocate a Network Function

In addition to the criteria described in the previous section, other criteria may also be applied such as the characteristics of the functions and the relationship and dependency between network functions performed at different protocol layers. These other criteria may include the benefits of grouping specific functionality together. For example, one benefit may be the use of common memory for the different functions without the need to copy data between different processors and/or memories. Other criteria may include the possibility to provide RAN coordination features on different levels such as fast UL CoMP, fast DL CoMP, combined cell, carrier aggregation, slow UL CoMP, slow DL, CoMP and Dual Connectivity. Further criteria may include an impact on transport network in the split point, i.e., resulting transport network requirements and hardware requirements for specific time-critical radio interface functionality.

Example Scenario—Split of Functionality Related to Different LTE Protocol Layers In another embodiment, applying the criteria defined above and assuming the current protocol stack defined for E-UTRAN architecture, the following functional split may be performed. The PHY layer functionality is co-located close to the radio interface. It is also possible to divide the PHY-layer into different parts when a high speed and low latency data interface is available, such as the CPRI interface between DU and RRU. The CPRI interface could be enhanced from current time domain (IQ samples) to frequency domain data by moving the IFFT/FFT and cyclic prefix insertion/removal to the RRU. This may relax the bandwidth requirement on the CPRI interface.

The MAC layer is preferably co-located very close to the PHY layer. Functions in these two compose SFGs. The MAC layer contains both the UL and DL scheduler and the HARQ functionality. The MAC scheduler works on TTI timescale (1 ms in the case of LTE) and allocates users to RBs. This scheduling is based also on information retrieved from the UL. In order to use the latest information, it is advantageous to have the scheduler in the same location as PHY.

The HARQ functionality has very tight delay requirements. The HARQ functionality is designed for 8 ms round-trip time. This means that at most 3 ms processing time is possible in the network from a received UL transmission to a corresponding next DL transmission, as the UL transmission spans the 1 ms subframe duration. Taking also into account the transport network delay, this may leave about 2.5 ms for the network processing and additional increase of the transport network delay would put even tighter requirements on the network processing part.

The RLC layer is preferably co-located together with the MAC layer. Functions in these two compose SFGs. The main reasons for this are the following. The RLC layer includes dynamic RLC-PDU size construction. The size is related to the data rate scheduled in MAC. In order not to lose time for the scheduler decision due to transmission delay between modules, it is advantageous to have RLC and MAC co-located. If RLC and MAC would be split then new, and possibly complex, flow control functionality would be needed between RLC and MAC buffers, depending on the transport network delay.

However, there are no tight requirements to place RRC and PDCP layers and functionality close to the RLC layer.

These considerations result in the following split of eNB functionality. RLC, MAC and PHY functionalities are kept together since their functionalities are considered as forming a SFG and RRC and PDPC are kept together since their functionalities are considered as asynchronous. Therefore, the new functional split of the eNB gives two new functional entities or logical network elements: eNB-a (for eNB-asynchronous network functions) and eNB-s (for eNB-synchronous network functions). This is further illustrated in FIGS. 17a and 17b.

Figure 17A:
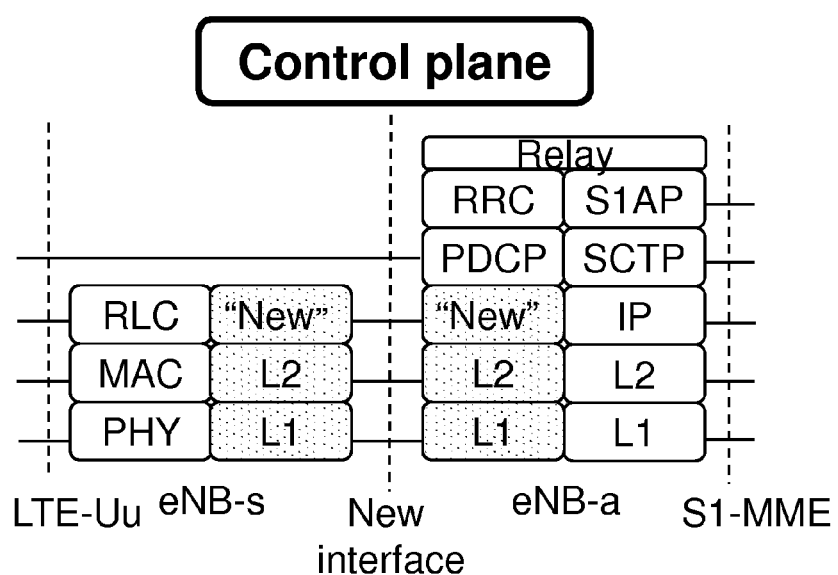
FIGS. 17a and 17b schematically illustrate an eNB split into eNB-a and eNB-s, according to various embodiments.
Figure 17B:
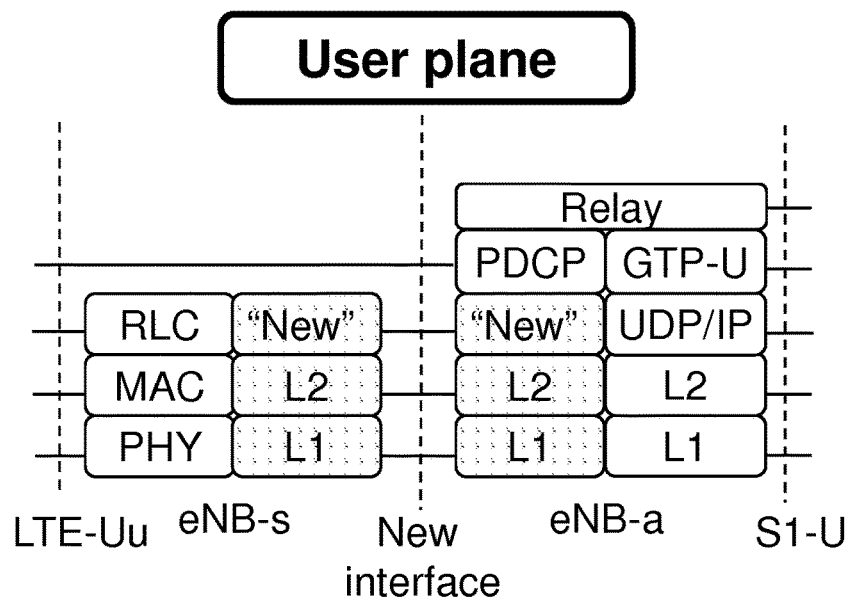
Figure 18:
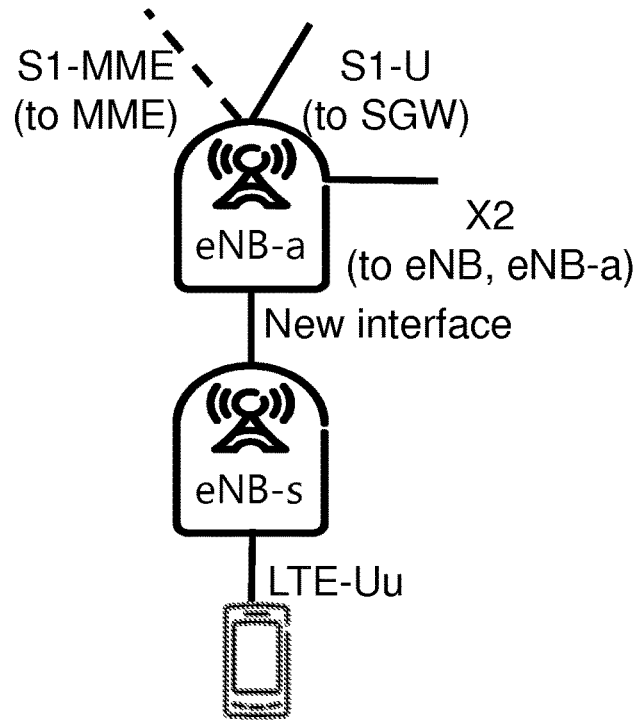
FIG. 18 schematically illustrates a Network Architecture showing eNB-a and eNB-s, according to various embodiments.

FIG. 17a shows the eNB-a (and the eNB-s) for the control plane and FIG. 17b shows the eNB-a (and the eNB-s) for the user plane. In different options these parts of the eNB-a can be either combined or separated. FIG. 18 shows an exemplary network architecture view of the combined eNB-a case. The interface between the eNB-a and the eNB-s is a new interface. The other interfaces are the conventional 3GPP interfaces.

Example Scenario—Dual Connectivity

Embodiments of the present invention disclosure are related to providing new functionality in existing (2G, 3G, 4G, etc.) and future Radio Access Networks (5G, 6G, etc.). The functionality is to provide tight integration between different Radio Access Types (such as 4G, and 5G), for example regarding DC for the Control Plane. DC also makes it possible to send/receive data over all LTE carriers, without requiring tight time synchronization as in CA. This is enabled since the UE will listen to all scheduling channels on all carriers.

Figure 19:
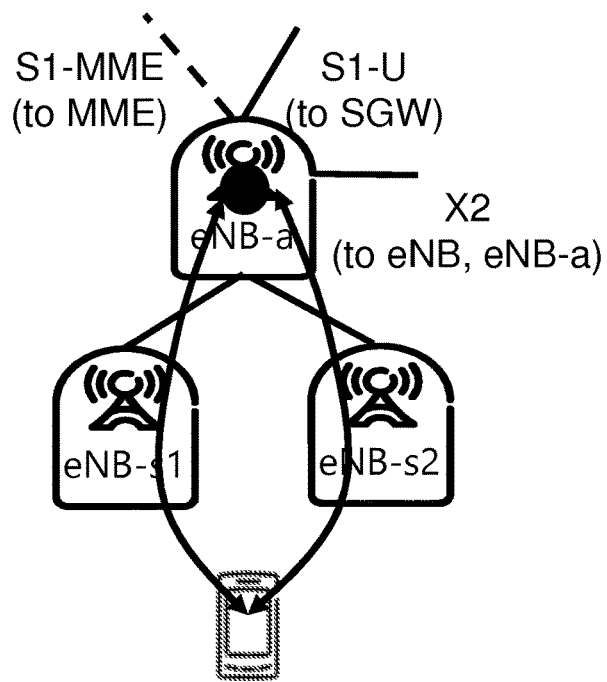
FIG. 19 schematically illustrates a Dual Connectivity with eNB-a and eNB-s, according to various embodiments.

In one example scenario, the proposed split of functionality enables a common control point for DC solutions for both control and user planes within LTE. The LTE scenario is just one non-limiting example embodiment. The solution may be applied for any other air interface too. The eNB-a can be the common point when the UE is connected via two or more different eNB-s. This is shown in FIG. 19 in which the UE is connected via both eNB-s1 and eNB-s2 to eNB-a. The eNB-a contains in general the asynchronous functions, i.e. the common protocols for both control plane (RRC and PDCP) and user plane (PDCP).

Note that a non-LTE-compatible 5G access is likely to have different lower layer protocols compared to LTE-compatible 5G access, e.g. due to the high frequencies it may be supposed to operate and/or the new use cases it may be required to address. Therefore CA between LTE and the new 5G radio accesses may be difficult. The standardized DC solution contains only different levels of user plane aggregation but no means for Dual Control Plane between two different LTE-carriers or between LTE-compatible and non-LTE-compatible carriers.

In another scenario, a given UE is able to connect to multiple air interfaces (not necessarily at the same time).

The previously described functional split can be extended so that the same instance of asynchronous functions is defined for these multiple air interfaces, having distinct SFGs per air interface, e.g. compatible-LTE and non-compatible LTE parts in the 5G radio access.

The new split of synchronous and asynchronous functions applies especially to DC between different RATs (e.g. one LTE RAT and one 5G RAT). In this case the eNB-a can contain common support for both control and user plane for the asynchronous functions, and the eNB-s contain the synchronous functions. Furthermore, this also enables that the synchronous functions are RAT-specific, for example different for LTE RAT and 5G RAT. With reference to FIG. 19, eNB-a may thus be common for 5G & LTE, and eNB-s1 may be LTE-specific while eNB-s2 may be 5G specific.

Allocating Resources for the Instantiation of Network Functions

According to embodiments of the invention, a network element that may be referred to as an NFO is allocating resources of the wireless communication network for the instantiation of a first network function, based on whether the first network function is synchronous or asynchronous.

In one embodiment for flexible function instantiation of asynchronous functions, the instantiation is triggered by preconfigured events. As described previously, the method is executed by a network element that may be called the NFO that has access to state information about the RBS and FNNs as well as requirements related to the asynchronous functions. In embodiments, the NFO may have access to information about:

1. The available resources of the radio access node (e.g. RBS) and the FNNs. These may be software resources (e.g. memory, processing power), hardware resources (e.g. number of blades, number of processors, type of processors, if generic or specific-purpose, presence/amount of hardware accelerator), and delay and jitter measurements/statistics from the m-th FNN and the RBS.
2. The requirements of the asynchronous functions in terms of software, hardware and time criticality.

At the NFO, network events that may be pre-configured trigger the instantiation of the asynchronous functions that take the information in bullet (1) and (2) above into account to decide where to instantiate the asynchronous functions, i.e., where to allocate resources for the functions, e.g., at the RBS or at any of the FNNs.

Figure 20:
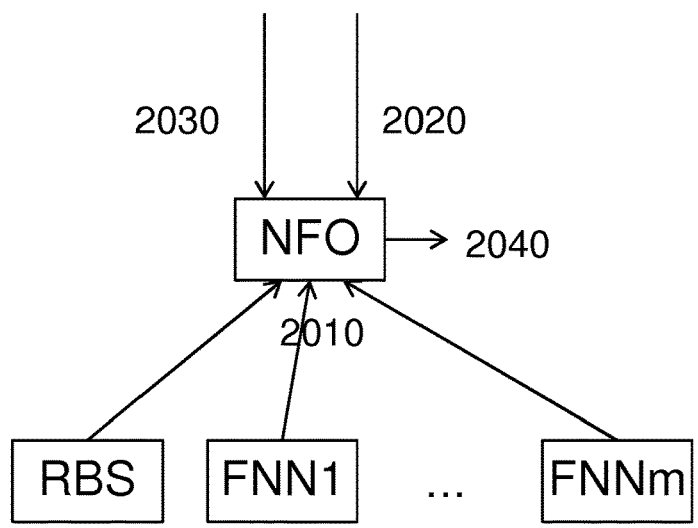
FIG. 20 schematically illustrates a Network Function Orchestrator (NFO) and the information flow, according to various embodiments.

FIG. 20 shows the information flow to and from the NFO, illustrated by arrows. The arrows 2010 from the network nodes (RBS and FNNs) to the NFO may correspond to state information related to the available resources at the network nodes in terms of hardware and/or software resources. The arrow 2020 corresponds to the requirements of the asynchronous functions and the synchronous functions, e.g. in terms of software, hardware and time criticality. The arrow 2030 corresponds to network events that trigger the instantiation of asynchronous functions. The arrow 2040 illustrates the decision made based on the input to the NFO, where the NFO decides where in the network to allocate resources for the different synchronous and asynchronous functions.

The events triggering the instantiation in 2030 may be initial network configuration and network reconfigurations, in which case the resource allocation is a semi-permanent allocation. However, the network event triggering the resource allocation may also be a lack of resources at a pre-determined network node or entity, occurring e.g. when all or almost all resources of a certain type already are in use.

Another alternative is that the triggering event is a node or link failure, or other planned maintenance actions. Furthermore, as already mentioned previously, the network event triggering the resource allocation according to embodiments may also be an event on a wireless device level, such as an initial access or a handover access of a wireless device, thus making the resource allocation more dynamic. Other examples of the network events may be pre-configured events such as the setup of a new eNB-s that triggers the instantiation of cell-based asynchronous functions. It can also be the initial access of a given UE triggering the instantiation of UE-specific asynchronous functions. It can also be some event at the FNNs, e.g. lack of resources or imminent lack of resources. The instantiation of a network function can also occur for a multi-RAT scenario where common asynchronous functions are instantiated to multiple air interfaces, RATs or air interface variants. This can either be cell-based asynchronous functions of UE-based asynchronous functions.

The NFO decides where to instantiate asynchronous functions and to allocate resources. As described, the instantiation may be triggered by some event in the network. Alternatively, the instantiation may be constantly updated. The information illustrated by arrows 2010, 2020 and 2030 and described above may be obtained statically, semi-statically or dynamically. In one example, the total amount of available hardware and software in a network entity, such as memory, and processing power, is updated only when upgrades are performed. However, the proportion of utilized resources in the network entity can be updated more frequently.

A method embodiment classifies RAN functions as synchronous and asynchronous and, based on that differentiation between synchronous and asynchronous functions, flexibly instantiate asynchronous functions in any of multiple network nodes that can be close to the air interface or at FNNs, e.g. placed in data centers.

In one example cases, a UE may try to access a cell, i.e., some asynchronous functions should already be instantiated which is mainly cell-specific. This event triggers UE-based asynchronous function instantiation. Based on all inputs (see FIG. 20), the NFO decides to instantiate the asynchronous function at a given site. An S1-like interface may be available between the eNB-a and the site hosting the eNB-a for that UE. The eNB-s may be informed where the eNB-a is located. Alternatively the event triggering instantiation contains the eNB-s identity that is informed to the newly instantiated eNB-a so that the other can be found to establish an S1-like link.

Another example case involves a reconfiguration of the functional groups. For example, initially, a specific split and/or deployment is used for a specific UE and then later on a need is detected to change the current split and/or deployment. This means that such an example case may start with both "eNB-a" and "eNB-s" distributed far out in the network, while it later on it may be detected that "eNB-s" should be centralized and the corresponding synchronous functions therefore should be instantiated at other network resources. In another example it may be the opposite and the case may start initially with a more central "eNB-s" and then later on it is detected that the eNB-s should be distributed.

Signaling in Network to Apply Instantiation

In a first example scenario, the NFO decides, triggered by a network reconfiguration, to instantiate some network functions to network entity-1, and some to network entity-2. The NFO therefore needs to initiate signaling towards the different network entities to inform about the decision and/or to apply the instantiation at the network entities. Furthermore, network entity-1 and network entity-2 may have to be informed about each others existence, and also about which ranges of wireless device identifiers, or radio/network resources that these network entities are associated with. In one non-limiting example, the following information needs to be signaled, e.g. to network entity-1:

1. Information that the network entity-1 shall take care of "PHY-layer" for some or all UEs, or some or all radio/network resources.
2. A list of the addresses to other network entities, e.g. network entity-2, handling other network functions for some or all UEs, or some or all radio/network resources. There may be several other network entities handling different groups of UEs, or resources.
3. Information related to cell resources or range of UE identifiers that this entity is responsible for, and that the entity should handle.

In a second example scenario, a UE performs Random Access via network entity-1. Network entity-1 informs the NFO about the UE access attempt. The NFO then decides, triggered by the received information that the UE is performing a random access, to instantiate some network functionality for providing a communication service to the UE.

The NFO decides on how to allocate different functionality for the UE. The following may be decided by NFO:

1. network entity-1 shall provide the PHY-layer functionality for the UE;
2. network entity-2 shall provide the MAC- and RLC-layer functionalities for the UE;
3. network entity-3 shall provide the PDCP-layer and RRC-layer functionalities for the UE.

The NFO needs to start some signaling towards all the different network entities about the decision. In addition, there is a need to inform the different network entities about the other network entities. The following signaling may be needed:

NFO signals to network entity-1:
1. Information to take care of the "PHY-layer" for the UE.
2. The address of "network-entity-2".
3. A common UE identifier, so that any data sent from network-entity-1 to network-entity-2 can be identified in network-entity-2 (and vice versa). Another alternative may be that a connection is established between the different network entities (functionally dedicated circuitry).

NFO signals to network entity-2:
1. Information to take care of "MAC&RLC-layers" for the UE.
2. The address of both "network-entity-1" and "network-entity-3".
3. A common UE identifier (see above).

NFO signals to network entity-3:
1. Information to take care of "PDCP & RRC-layers" for the UE.
2. The address of "network-entity-2".
3. A common UE identifier is also needed (see above).

Advantages of Embodiments

One advantage of a resource allocation according to embodiments of the invention based on the differentiating between synchronous and asynchronous network functions is that it enables flexible functional deployments for the asynchronous functions while still fulfilling the requirements on processing timing of the synchronous functions. Furthermore, an objective set of criteria to constrain the functional placements of e.g. SFGs is proposed.

Embodiments of the invention may enable flexible centralization and/or distribution of functions depending on the delay requirements of a given service associated to a UE trying to access the network, or associated to a given deployment (e.g. within a factory with devices having ultra-reliable MTC requirements).

The flexibility in instantiating and allocating resources for asynchronous functions enables a better scalability. One explanation is that the RAN control plane functionalities—e.g. at the current RRC layer in LTE—are asynchronous and mainly scale with the number of devices, while the synchronous functions scale with the amount of traffic.

Embodiments of the present invention are extended to the case of the UE being able to connect to multiple air interfaces, though not necessarily at the same time. Therein, tight Control Plane integration, also known as Dual Control Plane, between different radio accesses is provided. The main benefit with this is resilient control plane solutions minimizing any visible interruptions while the UE moves between radio accesses.

Embodiments of Method Described with Reference to FIGS. 27a-b

Figure 27A:
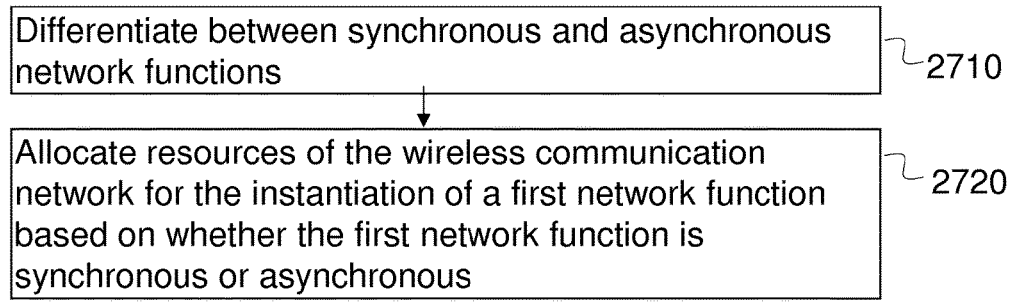
FIGS. 27a-b are flow charts schematically illustrating one embodiment of a method for a wireless device, according to various embodiments.

FIG. 27a is a flowchart illustrating one embodiment of a method of resource allocation for supporting communications with a wireless device. The method is performed in a network element 2800 of a wireless communication network. This network element may be the NFO described in the previous sections. The method comprises:

2710: Differentiating between synchronous network functions and asynchronous network functions. The synchronous and asynchronous network functions are associated with the provision of communication services to the wireless device. The synchronous network functions have requirements on processing timing which are strictly dependent on timing of a radio link used for communicating with the wireless device. The asynchronous network functions have requirements on processing timing not strictly dependent on the timing of the radio link. Some examples of synchronous and asynchronous network functions are given in the section "Differentiating between synchronous and asynchronous network functions" above.

2720: Allocating resources of the wireless communication network for the instantiation of a first network function based on whether the first network function is synchronous or asynchronous.

Figure 27B:
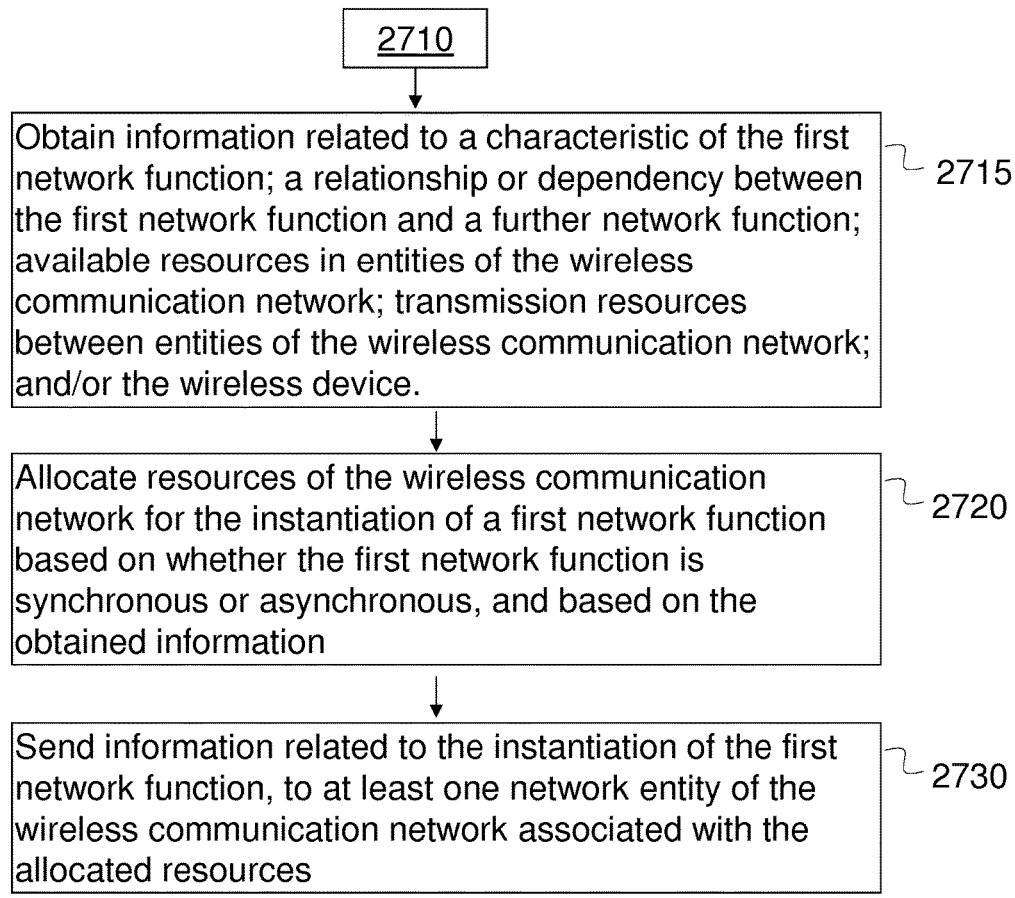

FIG. 27b is a flowchart illustrating another embodiment of the method in the network element 2800. The method comprises:

2710: Differentiating between synchronous network functions and asynchronous network functions. The synchronous and asynchronous network functions are associated with the provision of communication services to the wireless device. The synchronous network functions have requirements on processing timing which are strictly dependent on timing of a radio link used for communicating with the wireless device. The asynchronous network functions have requirements on processing timing not strictly dependent on the timing of the radio link.

2715: Obtaining information related to at least one of the following: a characteristic of the first network function; a relationship or dependency between the first network function and a further network function; available resources in entities of the wireless communication network; transmission resources between entities of the wireless communication network; the wireless device.

The characteristic of the first network function may e.g. be a timing characteristic. The relationship or dependency between the first network function and a further network function may e.g. be relationships or dependencies such as those that exist between PHY, MAC and RLC in LTE (see section above "Example scenario—Split of functionality related to different LTE protocol layers"). The information related to available resources in entities may e.g. be available processing, and memory resources in the different entities where the functionality may be instantiated. The information related to transmission resources between entities of the wireless communication network may for example information about latency between the different entities. Information related to the wireless device may be information regarding subscription type, ongoing "traffic/bearers" and quality of service of these.

2720: Allocating resources of the wireless communication network for the instantiation of a first network function based on whether the first network function is synchronous or asynchronous, and based also on the obtained information. This means that other criteria can be applied when making the allocation decision, not just the fact that the network function is synchronous or asynchronous.

2730: Sending information related to the instantiation of the first network function. The information is sent to at least one network entity of the wireless communication network associated with the allocated resources. Examples of signaling of information and type of information signaled is given in the section "Signaling in network to apply instantiation" above.

In any of the above embodiments described with reference to FIGS. 27a and 27b, allocating 2720 the resources for the instantiation of the first network function may comprise, when the first network function is synchronous:

Allocating first resources resulting in latency for transmission and reception over the radio link which is below a threshold, thereby fulfilling the requirements on processing timing for synchronous network functions.

By e.g. allocating resources in the network node that is closest to the air interface, the latency for transmission and reception over the radio link will be low. This is thus a suitable resource allocation for a synchronous function which has to be executed within a limited time window. Optionally, the allocation of resources may also be done based on other criteria or based on the information obtained in step 2715 described above.

In the embodiment described with reference to FIG. 27b, allocating 2720 the resources for the instantiation of the first network function may comprise, when the first network function is asynchronous:

Allocating second resources that may result in higher latency for transmission and reception over the radio link than the first resources do, based on the obtained information.

For an asynchronous network function, the latency for transmission and reception over the radio link does not always have to be low. However, other criteria such as a relation to another network function or characteristics of the current network function may be relevant to take into account when allocating resources. A concrete example of how to allocate resources is given in section "Example scenario—Split of functionality related to different LTE protocol layers" above.

In any of the embodiments above described with reference to FIGS. 27a and 27b, the allocated resources may comprise one or more of processing resources, memory resources, and resources related to network interfaces. Resources related to network interfaces may e.g. be transmission bandwidth in the different transport or network interfaces.

Furthermore, in embodiments resources may be allocated also for the instantiation of a second network function based on whether the second network function is synchronous or asynchronous. The first network function and the second network function may respectively correspond to different protocol layers, as described previously. The first and second network functions may both be synchronous network functions grouped into a synchronous function group or SFG. Resources resulting in latency for transmission and reception over the radio link which is below the threshold may be allocated for the SFG.

In any of the embodiments described above the allocation 2720 of resources may be triggered by a network event. As described previously, events triggering the instantiation may be initial network configuration and network reconfigurations, in which case the resource allocation is a semipermanent allocation. However, the network event triggering the resource allocation may also be a lack of resources at a pre-determined network node or entity, occurring e.g. when all or almost all resources of a certain type already are in use. Another alternative is that the triggering event is a node or link failure, or other planned maintenance actions. Furthermore, the triggering network event may also be an event on a wireless device level, such as an initial access or a handover access of a wireless device, thus making the resource allocation more dynamic.

In a further embodiment, a first and a second radio link may be used for communicating with the wireless device for dual connectivity operation. The method in the network element or NFO may then comprise when the first network function is asynchronous and associated with both the first and the second radio links:
 Allocating resources for the instantiation of the first network function such that at least partly the same resources can be utilized when the operation of the first network function is associated with the first radio link and when the operation of the first network function is associated with the second radio link.

Embodiments of Apparatus Described with Reference to FIGS. 28a-b

Figure 28A:
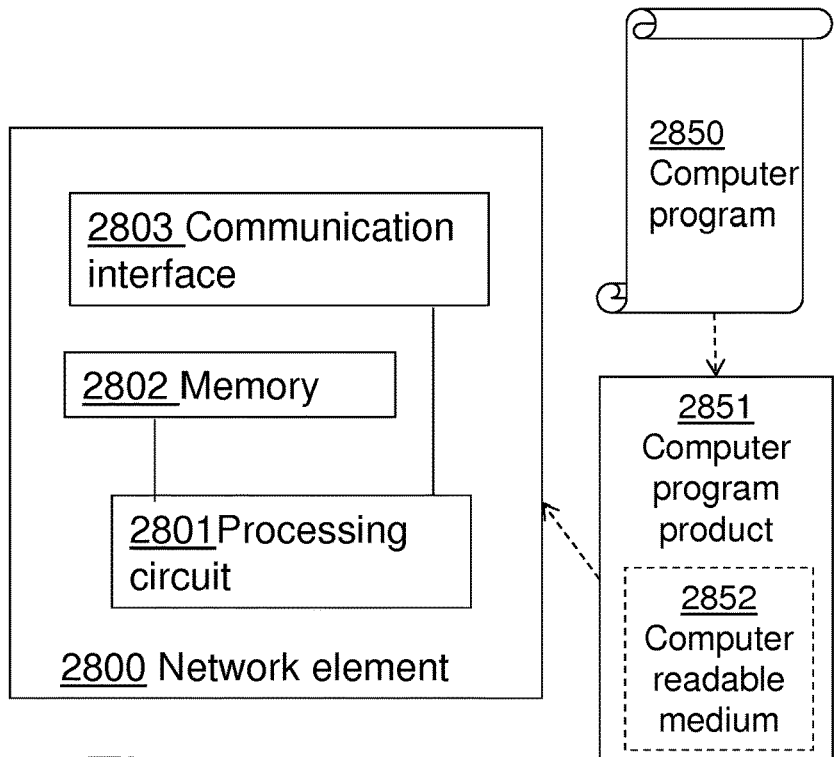
FIG. 28a-b are block diagrams schematically illustrating one embodiment of a wireless device, according to various embodiments.

An embodiment of a network element 2800 for a wireless communication network is schematically illustrated in the block diagram in FIG. 28a. The network element is configured to allocate resources for supporting communications with a wireless device. The network element is further configured to differentiate between synchronous network functions and asynchronous network functions. The synchronous and asynchronous network functions are associated with the provision of communication services to the wireless device. The synchronous network functions have requirements on processing timing which are strictly dependent on timing of a radio link used for communicating with the wireless device. The asynchronous network functions have requirements on processing timing not strictly dependent on the timing of the radio link. The network element is also configured to allocate resources of the wireless communication network for the instantiation of a first network function based on whether the first network function is synchronous or asynchronous.

In embodiments, the network element 2800 may be further configured to obtain information related to at least one of the following: a characteristic of the first network function; a relationship or dependency between the first network function and a further network function; available resources in entities of the wireless communication network; transmission resources between entities of the wireless communication network; the wireless device. The network element 2800 may then be further configured to allocate the resources for the instantiation of a first network function based also on the obtained information.

The network element 2800 may be further configured to—when the first network function is synchronous—allocate the resources for the instantiation of the first network function by allocating first resources resulting in latency for transmission and reception over the radio link which is below a threshold. Thereby the requirements on processing timing for synchronous network functions can be fulfilled. Optionally, the allocation of the resources for the instantiation of a first network function may be based also on the obtained information.

The network element 2800 may be further configured to—when the first network function is asynchronous—allocate the resources for the instantiation of the first network function by allocating second resources that may result in a higher latency for transmission and reception over the radio link than the first resources do, based on the obtained information.

The allocated resources may comprise at least one of: processing resources, memory resources, and resources related to network interfaces.

In one embodiment, the network element 2800 may be configured to allocate resources also for the instantiation of a second network function based on whether the second network function is synchronous or asynchronous. The first network function and the second network function may respectively correspond to different protocol layers. The first and second network functions may both be synchronous network functions grouped into a synchronous function group or SFG. The network element may then be further configured to allocate resources resulting in latency for transmission and reception over the radio link which is below the threshold for the synchronous function group or SFG.

In embodiments, the network element 2800 may be further configured to send information related to the instantiation of the first network function. The information may be sent to at least one network entity of the wireless communication network associated with the allocated resources.

Furthermore, in any of the described embodiments, the network element 2800 may be configured to allocate the resources triggered by a network event.

In one embodiment, a first and a second radio link are used for communicating with the wireless device for dual connectivity operation. The first network function is asynchronous and associated with both the first and the second radio links. The network element 2800 may then be configured to allocate resources for the instantiation of the first network function such that at least partly the same resources can be utilized when the operation of the first network function is associated with the first radio link and when the operation of the first network function is associated with the second radio link.

As illustrated in FIG. 28a, the network element 2800 may comprise a processing circuit 2801 and a memory 2802 in embodiments of the invention. The network element 2800 may also comprise a communication interface 2803 configured to communicate with other nodes of the communication network. The memory 2802 may contain instructions executable by said processing circuit 2801, whereby the network element 2800 is operative to differentiate between synchronous network functions and asynchronous network functions. The synchronous and asynchronous network functions are associated with the provision of communication services to the wireless device. The synchronous network functions have requirements on processing timing which are strictly dependent on timing of a radio link used for communicating with the wireless device. The asynchronous network functions have requirements on processing timing not strictly dependent on the timing of the radio link. The network element 2800 may be further operative to allocate resources of the wireless communication network for the instantiation of a first network function based on whether the first network function is synchronous or asynchronous.

Figure 28B:
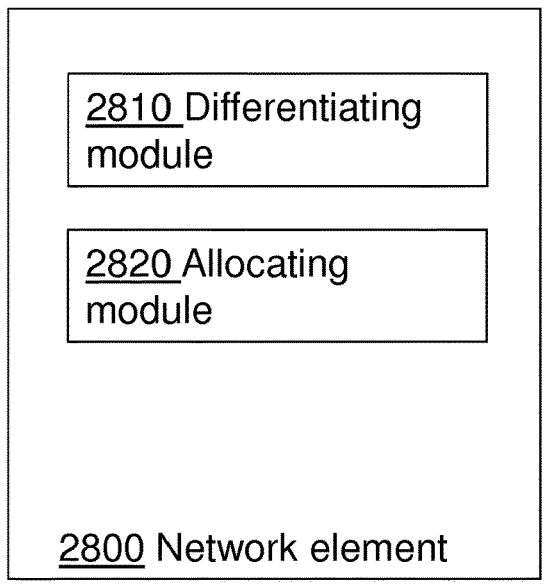

In an alternative way to describe the embodiment in FIG. 28a, illustrated in FIG. 28b, the network element 2800 may comprise a differentiating module 2810 adapted to differentiate between synchronous network functions and asynchronous network functions. The synchronous and asynchronous network functions are associated with the provision of communication services to the wireless device. The synchronous network functions have requirements on processing timing which are strictly dependent on timing of a radio link used for communicating with the wireless device. The asynchronous network functions have requirements on processing timing not strictly dependent on the timing of the radio link. The network element 2800 may also comprise an allocating module 2820 adapted to allocate resources of the wireless communication network for the instantiation of a first network function based on whether the first network function is synchronous or asynchronous.

The network element 2800 may in embodiments also comprise a sending module adapted to send information related to the instantiation of the first network function. The information may be sent to at least one network entity of the wireless communication network associated with the allocated resources. The network element 2800 may also comprise an obtaining module adapted to obtain information related to at least one of the following: a characteristic of the first network function; a relationship or dependency between the first network function and a further network function; available resources in entities of the wireless communication network; transmission resources between entities of the wireless communication network; the wireless device. The allocating module 2820 may then be adapted to allocate the resources based also on the obtained information.

The modules described above are functional units which may be implemented in hardware, software, firmware or any combination thereof. In one embodiment, the modules are implemented as a computer program running on a processor.

In still another alternative way to describe the embodiment in FIG. 28a, the network element 2800 may comprise a Central Processing Unit (CPU) which may be a single unit or a plurality of units. Furthermore, the network element 2800 may comprise at least one computer program product (CPP) 2851 with a computer readable medium 2852 in the form of a non-volatile memory, e.g. an EEPROM (Electrically Erasable Programmable Read-Only Memory), a flash memory or a disk drive. The CPP 2851 may comprise a computer program 2850 stored on the computer readable medium 2853, which comprises code means which when run on the CPU of the network element 2800 causes the network element 2800 to perform the methods described earlier in conjunction with FIGS. 27a-b. In other words, when said code means are run on the CPU, they correspond to the processing circuit 2801 in FIG. 28a.

Embodiments of Method and Apparatus Described with Reference to FIGS. 21-26

Figure 21:
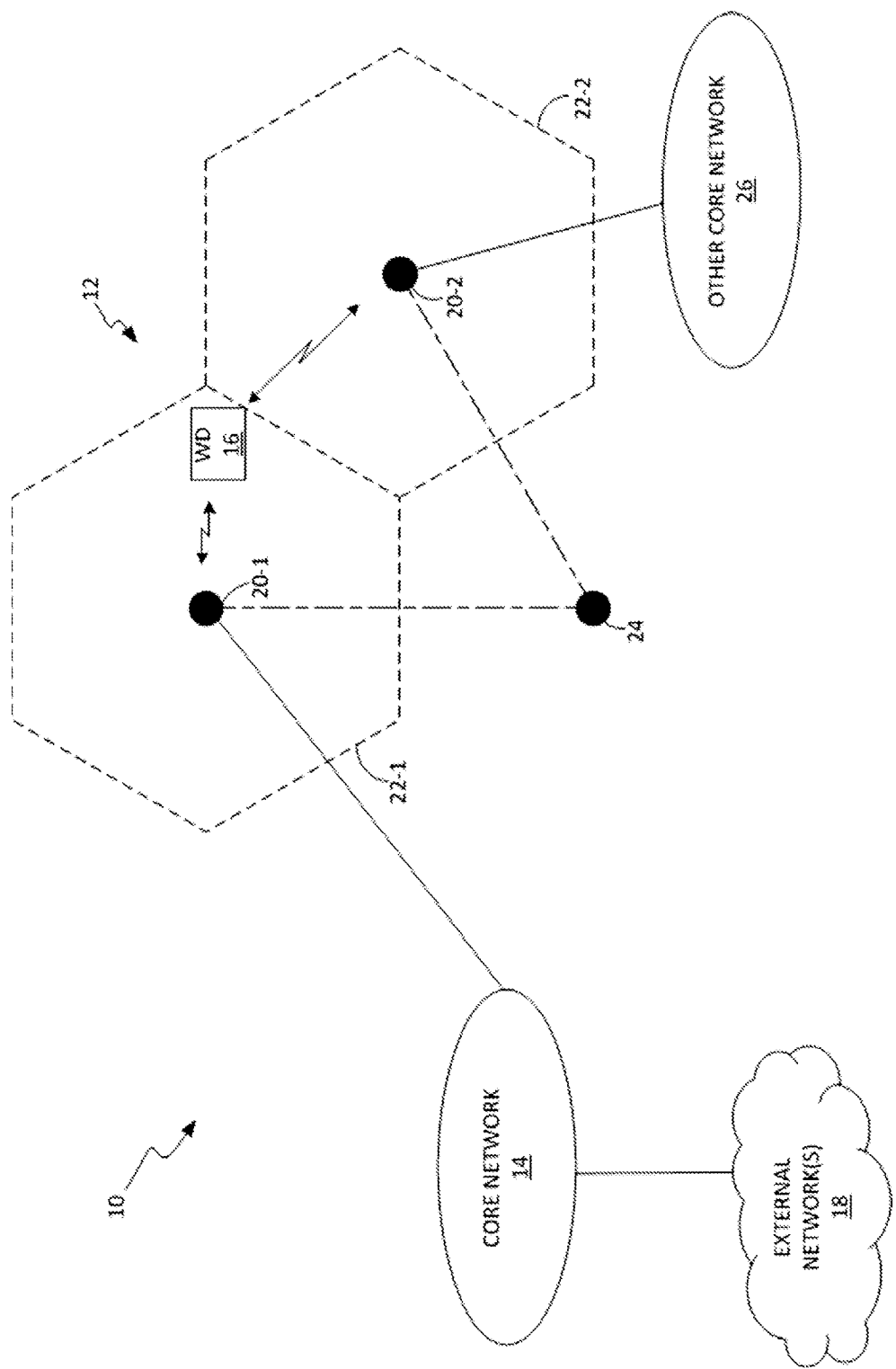
FIG. 21 is a block diagram of one embodiment of wireless communication networks, according to various embodiments.

FIG. 21 illustrates an embodiment of a wireless communication network 10, which may actually include more than one overall network, or which may at least include two or more Radio Access Networks (RANs) 12, that may be of different Radio Access Technologies or RATs.

In the example illustration the network 10 further includes a Core Network (CN) 14 and possibly another CN 26. For example, a base station 20-1 serves a cell 22-1 according to first RAT and communicatively couples to the CN 14, and a base station 20-2 serves a cell 22-2 according to a second RAT and couples to the CN 26.

Broadly, the network 10 communicatively couples wireless devices (WD) 16—one is shown for convenience—to one or more external networks 18, such as the Internet or another packet data network. The diagram is simplified for ease of discussion and it will be appreciated that the network 10 may include additional examples of any one or more of the illustrated entities and may include other entities not illustrated. For example, the CN 14 may include Mobility Management Entities or MMEs, Serving Gateways or SGWs, a Packet Gateway or PGW, and one or more other nodes, such as positioning nodes, Operations & Maintenance nodes, etc. The network 10 in an example embodiment includes nodes configured according to LTE standards and nodes configured according to a 5G or later generation network standards. Again, this may be regarded as having more than one type of RAN and/or corresponding CNs.

Of course, a given base station 20 may provide more than one cell 22, e.g., in the case of multi-carrier operation, and the teachings herein are not limited to arrangement of base stations 20 and cells 22 depicted in FIG. 21. For example, the cell sizes may be adaptive or non-uniform. In the latter case, the networks 10 may comprise a heterogeneous network where one or more large cells, referred to as "macro" cells are overlaid by one or more smaller cells, referred to a "micro," "pico," or "femto," cells. These smaller cells are provided by low-power access points and may be used as service hotspots that provide higher data rate services and/or may be used to extend or fill in the service coverage provided by the macro cells. In some heterogeneous deployments, the micro cells use the same radio access technology used by the macro cells, e.g., LTE-based micro cells overlaying LTE-based macro cells.

The WD 16 may communicate with multiple base stations, including bases stations supported by different networks or operating according to different RATs. For example, the WD 16 is in communication with the base stations 20-1 and 20-2, which may operate in accordance with the same or different RATs. Although the WD 16 is pictured in cell 22-1 serviced by base station 20-1, the WD 16 may also be serviced by base station 20-2.

The diagram of cells is for illustrative purposes and does not limit the ability of multiple base stations to handle functionality for the WD 16.

In any case, with respect to FIG. 21, consider the example case where two base stations 20 are used or will be used to support radio links with the WD 16. The network node 24 sends signaling to each such base station to instantiate synchronous functions at the base station, to support the radio link communications, and in response the base stations 20 allocate the necessary processing resources and instantiate the needed synchronous functions. Further, while not explicitly shown in FIG. 21, the network node 24 sends signaling to one or more other network nodes, other base station, hubs, centralized processing nodes, etc., that have processing resources of the type needed to perform asynchronous function processing associated with the communications supported over the radio links.

For example, FIG. 21 illustrates a non-limiting example embodiment where one base station 20-1 provides the radio link to a WD 16. The base station 20-1 is configured to instantiate the synchronous functions associated with communications between the WD 16 and the network 10. Further in this example, another base station 20-2 is configured to instantiate the asynchronous functions needed to support those communications. Communications between the two base stations for linking the synchronous and asynchronous functions may be carried over a link between them.

Figure 22:
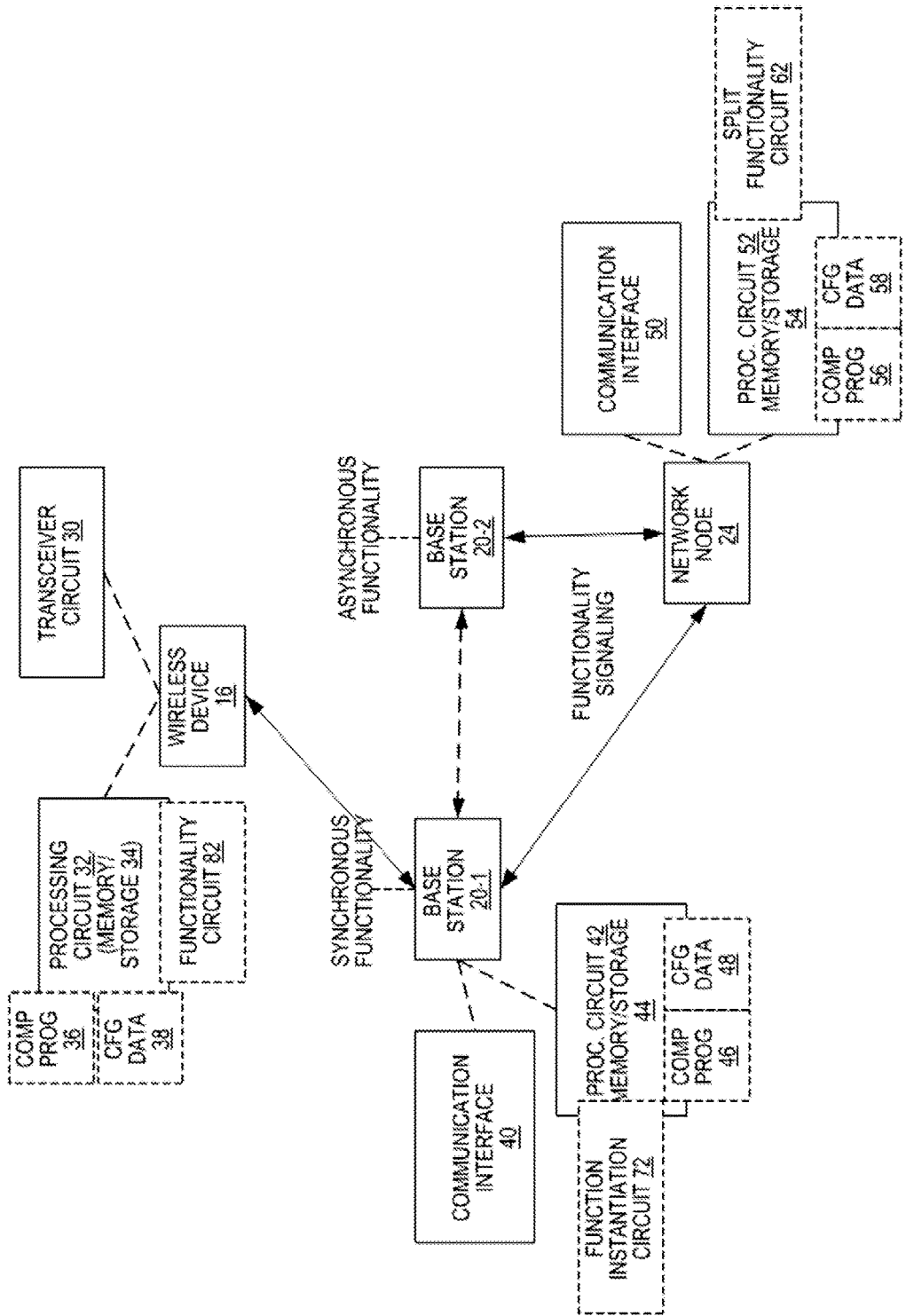
FIG. 22 is a block diagram of one embodiment of example details for a base station, a wireless device and a coordinating network node, according to various embodiments.

The differentiation of functions is determined and orchestrated by the network node 24, which may be referred to as a Network Function Orchestrator (NFO). Those of ordinary skill in the art will appreciate that FIG. 22 illustrates functional and/or physical circuit arrangements and that the base stations 20-1 and 20-2, the network node 24 and the WD 16 generally will include digital processing circuits (and associated memory or other computer-readable medium) for storing configuration data, operational or working data, and for storing computer program instructions. In at least some of the embodiments contemplated herein, the network-side and device-side functionality is realized at least in part through the programmatic configuration of digital processing circuitry, based on the execution by that circuitry of stored computer program instructions.

One sees from the example that the base station 20-1 includes a communication interface 40, a processing circuit 42 and associated memory/storage 44 (e.g., one or more types of non-transitory computer-readable medium, such as a mix of volatile, working memory and non-volatile configuration and program memory or storage). The communication interface(s) 40 depend on the nature of the base station 20-1, but generally include a radio transceiver (e.g., pools of radio transmission, reception, and processing circuitry) for communicating with any number of WDs 16 in any one or more cells 22 provided by the base station 20-1. In that example, the communication interface(s) 40 include one or more transmitters and receivers, e.g., cellular radio circuits, along with power control circuitry and associated signal processing circuitry. Further, in the same scenario, the communication interface(s) 40 may include inter-base-station interfaces, fronthaul and/or backhaul or other CN communication interfaces.

The processing circuit 42 comprises, for example, digital processing circuitry that is fixed or programmed to perform network-side processing as taught herein. In one embodiment, the processing circuit 42 comprises one or more microprocessors, Digital Signal Processors (DSPs), ASIC, FPGAs, etc., which are configured according to the teachings herein. The memory/storage 44 may comprise a mix of working memory and non-volatile program memory, such as FLASH or a Solid-State-Disk, SSD, or any other type of computer readable medium configured to provide persistent storage for, e.g., a computer program 46 and/or various configuration data 48.

In an example embodiment, the processing circuit 42 is at least partly configured according to the teachings herein, based on its execution of the computer program instructions comprising the computer program 46. In this regard, the memory/storage 44 will be understood as comprising a computer-readable medium providing non-transitory storage for the computer program 46. Base station 20-2 may be constructed with similar components, although the functional processing it implements will be different, as least in the sense that it carries out asynchronous functions in this example, rather than the synchronous functions implemented at the base station 20-1. Of course, each base station 20 may provide synchronous functions for some connections and asynchronous functions for other connections and/or other nodes, e.g., fixed network nodes, may provide the asynchronous processing contemplated herein.

Turning to the example WD 16, which may be a cellular radiotelephone (smartphone, feature phone, etc.), a tablet or laptop computer, a network adaptor, card, modem or other such interface device, or essentially device or other apparatus that is configured for wireless communication in the networks 10. In the 3GPP context, the WD 16 is referred to as a UE, and it will be understood as including a communication interface, such as a transceiver circuit 30 that may include a radiofrequency receiver and a radiofrequency transmitter that are configured for operation according to the air interface of the networks 10.

The WD 16 further includes a processing circuit 32, which includes or is associated with memory/storage 34. The memory/storage 34 includes, for example, one or more types of computer-readable medium, such as a mix of volatile, working memory and non-volatile configuration and program memory or other storage. Similarly, those of ordinary skill in the art will appreciate that the transceiver circuit 30 may comprise a mix of analog and digital circuits. For example, the receiver in one or more embodiments comprises a receiver front-end circuit (not explicitly shown in FIG. 22) that generates one or more streams of digital signal samples corresponding to antenna-received signal or signals, along with one or more receiver processing circuits—e.g., baseband digital processing circuitry and associated buffer memory—which operate on the digital samples. Example operations include linearization or other channel compensation, possibly with interference suppression, and symbol demodulation/detection and decoding, for recovering transmitted information.

In turn, the processing circuit 32 provides, for example, digital baseband processing for the receive (RX) signals and transmit (TX) signals received and transmitted through the transceiver circuit 30. The processing circuit 32 in this regard comprises digital processing circuitry and may be implemented as one or more microprocessors, DSPs, ASICs, FPGAs, etc. More generally, the processing circuit 32 may be implemented using fixed circuitry or programmed circuitry. In an example embodiment, the memory/storage 34 comprises a computer-readable medium that stores a computer program 36 in a non-transitory manner. The processing circuit 32 in such embodiments is at least partly configured according to the teachings herein, based on its execution of the computer program instructions comprising the computer program 36.

Network node 24 includes a communication interface 50, a processing circuit 52 and associated memory/storage 54 (e.g., one or more types of non-transitory computer-readable medium, such as a mix of volatile, working memory and non-volatile configuration and program memory or storage). The communication interface(s) 50 include communication interface circuitry for communicating with base stations, for instantiating synchronous function processing and with base stations and/or other nodes in a RAN or a CN or external to the network 10, for instantiating asynchronous function processing.

The processing circuit 52 comprises, for example, digital processing circuitry that is fixed or programmed to perform network-side processing as taught herein. In one embodiment, the processing circuit 52 comprises one or more microprocessors, Digital Signal Processors (DSPs), ASIC, FPGAs, etc., which are configured according to the teachings herein. The memory/storage 54 may comprise a mix of working memory and non-volatile program memory, such as FLASH or a Solid-State-Disk, SSD, or any other type of computer readable medium configured to provide persistent storage for, e.g., a computer program 56 and/or various configuration data 58.

In an example embodiment, the processing circuit 52 is at least partly configured according to the teachings herein, based on its execution of the computer program instructions comprising the computer program 56. In this regard, the memory/storage 54 will be understood as comprising a computer-readable medium providing non-transitory storage for the computer program 56.

In an example, the network node 24 is configured, e.g., via configuration of the processing circuit 52, to differentiate between synchronous functions and asynchronous functions associated with providing communication services to wireless communication apparatuses, e.g., WDs 16, operating in the network 10. Here, "synchronous functions" have processing timings strictly dependent on timings of the radio link or links used for communicating with the wireless communication apparatus, and "asynchronous functions" having processing timings not strictly dependent on, or independent of, the timings of the one or more radio links. The network node 24 may be configured to allocate processing resources for the synchronous functions at the radio node or nodes providing the one or more radio links and allocate processing resources for the asynchronous functions at one or more asynchronous processing nodes, which may be the same as the nodes used to provide the radio links, or which may be one or more other nodes. The allocation of the processing resources needed for the asynchronous functions is performed in dependence on an allocation scheme that considers resource availability one or more nodes that are candidates for carrying out such processing.

In a further embodiment, the network node 24 is configured to signal to the base station 20-1 instantiation of the synchronous functions for the UE and signal to the base station 20-2 instantiation of the asynchronous functions for the UE.

In another embodiment, the network node 24 is configured to send signaling to one or more radio nodes to instantiate synchronous function processing to support radio links between the one or more radio nodes and the wireless communication apparatus and send signaling to one or more network nodes to instantiate asynchronous function processing supporting communications conducted over the one or more radio links. In some cases, there are two or more radio links corresponding to two or more Radio Access Technologies, RATs. The synchronous functions may be time sensitive with respect to a determined time window.

In an example, RLC, MAC and PHY functions may be associated with a SFG and RRC and PDPC may be associated with an aSFG.

In an example, the network node 24 instantiates functions of one network layer for the UE on a base station separate or remote from another base station or radio node that instantiates functions of another network layer for the UE.

In an example, the network node 24 obtains network information for the differentiation, wherein the information comprises state information of base stations and function requirements. In another example, the network node 24 signals base stations closer to the UE to provide synchronous functions. The network node 24 may be configured to determine a first base station for synchronous functions for the UE responsive to radio nodes meeting a set of criteria. The UE may be configured to perform dual control plane connectivity.

In an example, the network node 24 determines which functionalities should be RAT-specific or RAT-common in an integrated multi-RAT architecture and how these functions should be allocated among the bases stations or radio nodes.

Figure 23:
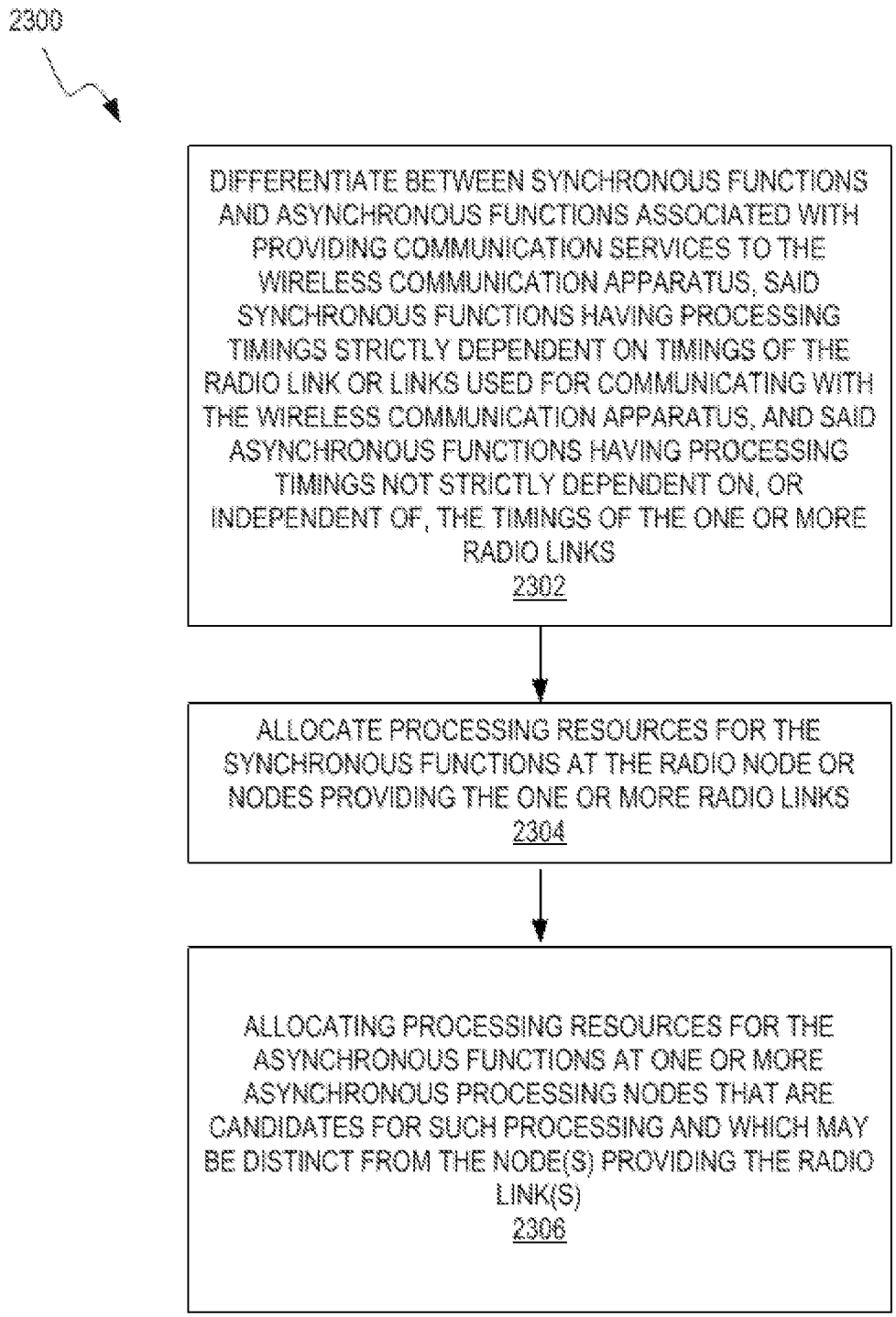
FIG. 23 is a logic flow diagram of one embodiment of a method of splitting functionality for a wireless device, according to various embodiments.

FIG. 23 illustrates an example embodiment of a method 2300 of resource allocation in a wireless communication network, for supporting communications with a wireless communication apparatus. It will be appreciated that the processing indicated in FIG. 23 may be implemented at least in part via programmatic configuration, based on the execution of stored computer program instructions, e.g., by the execution of the stored computer program 56 by the processing circuit 52, as shown in FIG. 22 for the network node 24. It will also be appreciated that no processing order is necessarily implied by FIG. 23 and that one or more of the illustrated method steps may be performed in an order different from the illustration. Further, the method 2300 or included steps therein may be performed in parallel, repeated or otherwise looped on a periodic or triggered basis, and/or may be performed in an ongoing sense, e.g., as part of ongoing or background processing.

The method 2300 includes differentiating between synchronous functions and asynchronous functions associated with providing communication services to the wireless communication apparatus, said synchronous functions having processing timings strictly dependent on timings of the radio link or links used for communicating with the wireless communication apparatus, and said asynchronous functions having processing timings not strictly dependent on, or independent of, the timings of the one or more radio links (block 2302). The method also includes allocating processing resources for the synchronous functions at the radio node or nodes providing the one or more radio links (2304). The method further includes allocating processing resources for the asynchronous functions at one or more asynchronous processing nodes that are candidates for such allocation (2306). This node (or these nodes) may be distinct from the base station(s) in which the synchronous functions are instantiated.

Another example method includes determining at least one base station for synchronous functions for the UE and at least one other base station, or other radio node, for asynchronous functions for the UE. The method also includes signaling to the at least one base station for instantiation of the synchronous functions for the UE and signaling to the other at least one base station or radio node for instantiation of the asynchronous functions for the UE.

Figure 24:
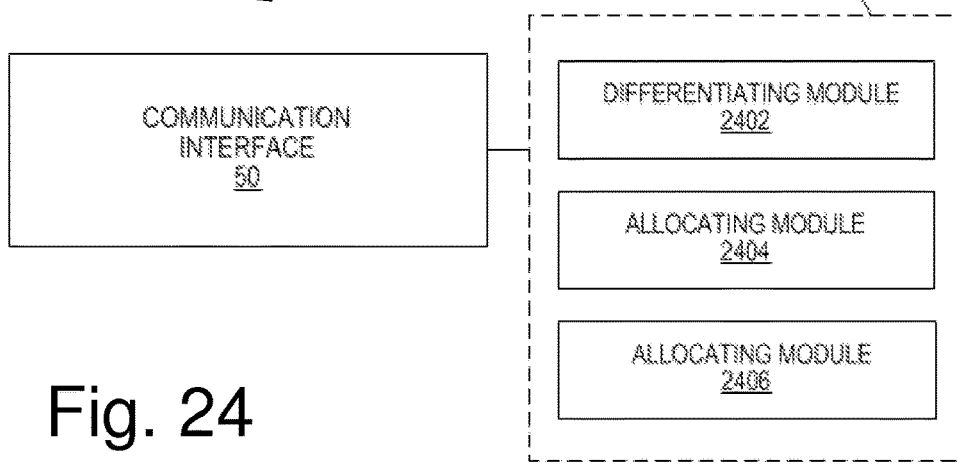
FIG. 24 is a function diagram of a network node, according to various embodiments.

FIG. 24 illustrates an example functional module or circuit architecture as may be implemented in a network node 24, based on the processing circuit 52 executing computer program instructions included in the computer program 56 stored in the storage memory 54. The illustrated embodiment includes a differentiating module 2402 configured to differentiate between synchronous functions and asynchronous functions associated with providing communication services to the wireless communication apparatus, said synchronous functions having processing timings strictly dependent on timings of the radio link or links used for communicating with the wireless communication apparatus, and said asynchronous functions having processing timings not strictly dependent on, or independent of, the timings of the one or more radio links. The embodiment also includes an allocating module 2404 configured to allocate processing resources for the synchronous functions at the radio node or nodes providing the one or more radio links. The embodiment further includes an allocating module 2406 configured to allocate processing resources for the asynchronous functions at one or more nodes among a plurality of nodes, in dependence on an allocation scheme that considers resource availability at the plurality of nodes, where said plurality of nodes includes at least one node different from the one or more radio nodes providing the one or more radio links. Signals are communicated through communication interface 50.

FIG. 22 also shows a function instantiation circuit 72 of the base station 20-1. The function instantiation circuit 72 may include or be a part of the processing circuit 42 executing a computer program 46 to implement a method for handling a split functionality for the UE. This functionality may be split over multiple base stations and/or multiple RATs. Further operations of the instantiation circuit 72 are described below. In an example, the base station 20-1 is configured to instantiate synchronous or asynchronous functions for a UE in response to receiving a signal indicating functionality requested for the UE.

Figure 25:
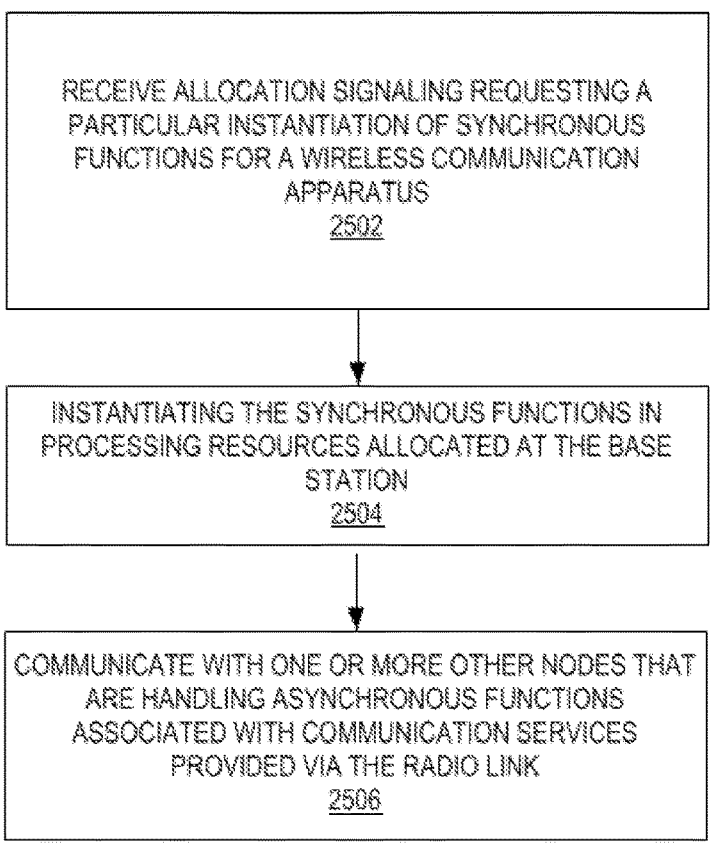
FIG. 25 is a logic flow diagram of one embodiment of a method of handling split functionality for a wireless device, according to various embodiments.

In another embodiment, the base station 20-1 is configured to instantiate the asynchronous functions for the UE in response to detection of a preconfigured event. The base station 20-1 may be configured to handle asynchronous functions for the UE and connect to two separate base stations that each handle synchronous functions for the UE. The base station 20-1 may also be configured to instantiate synchronous functions for a UE in response to receiving a signal indicating functionality requested for the UE and communicate with another base station handling asynchronous functions for the UE. FIG. 25 illustrates an example embodiment of a method 2500 of handling split functionality. It will be appreciated that the processing indicated in FIG. 25 may be implemented at least in part via programmatic configuration, based on the execution of stored computer program instructions, e.g., by the execution of the stored computer program 46 by the processing circuit 42, as shown in FIG. 22 for the base station 20-1. It will also be appreciated that no processing order is necessarily implied by FIG. 25 and that one or more of the illustrated method steps may be performed in an order different from the illustration. Further, the method 2500 or included steps therein may be performed in parallel, repeated or otherwise looped on a periodic or triggered basis, and/or may be performed in an ongoing sense, e.g., as part of ongoing or background processing.

The method 2500 includes receiving allocation signaling requesting a particular instantiation of synchronous functions for a wireless communication apparatus 2502. The method also includes instantiating the synchronous functions in processing resources allocated at the base station 2504 and communicating with one or more other nodes that are handling asynchronous functions associated with communication services provided via the radio link 2506.

Figure 26:
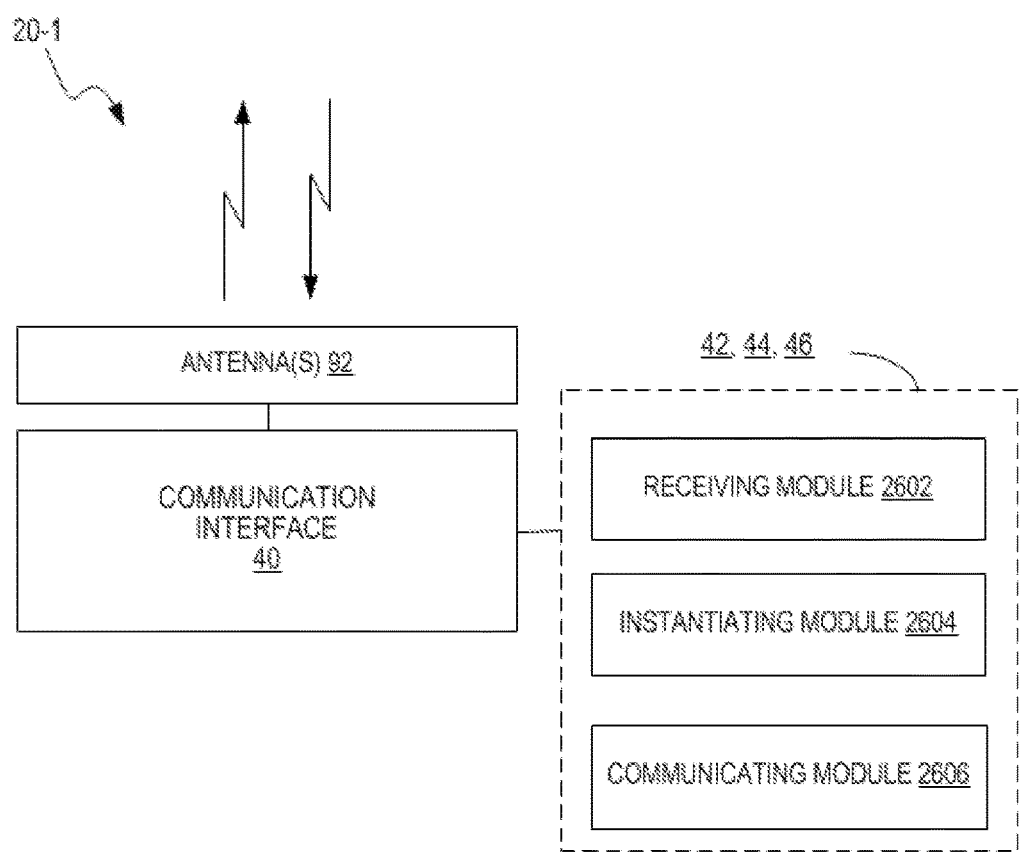
FIG. 26 is a function diagram of a base station, according to various embodiments.

FIG. 26 illustrates an example functional module or circuit architecture as may be implemented in a base station 20-1, based on the processing circuit 42 executing computer program instructions included in the computer program 46 stored in the storage memory 44. The illustrated embodiment includes a receiving module 2602 configured to receive allocation signaling requesting a particular instantiation of synchronous functions for a wireless communication apparatus. The embodiment also includes instantiation module 2604 configured to instantiate the synchronous functions in processing resources allocated at the base station. The embodiment also includes communicating module 2606 configured to communicate with one or more other nodes that are handling asynchronous functions associated with communication services provided via the radio link. Signals are communicated through communication interface 40 and antenna(s) 92. FIG. 22 also shows a functionality circuit 82 of the WD 16 (referred to as a "UE" for convenience). The functionality circuit 82 may include or be a part of the processing circuit 32 executing a computer program 36 to implement a method for handling a split functionality for the UE. This functionality may be split over multiple base stations and/or multiple RATs.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Non-limiting List of Example Embodiments

1. A method of resource allocation in a wireless communication network, for supporting communications with a wireless communication apparatus comprising: differentiating between synchronous functions and asynchronous functions associated with providing communication services to the wireless communication apparatus, said synchronous functions having processing timings strictly dependent on timings of the radio link or links used for communicating with the wireless communication apparatus, and said asynchronous functions having processing timings not strictly dependent on, or independent of, the timings of the one or more radio links;

allocating processing resources for the synchronous functions at the radio node or nodes providing the one or more radio links; and allocating processing resources for the asynchronous functions at one or more asynchronous processing nodes that are candidates for such processing, in dependence on an allocation scheme that considers resource availability, where the asynchronous processing nodes may be different from the one or more radio nodes providing the one or more radio links.

2. The method of embodiment 1, wherein the wireless communication apparatus has or will be allocated more than one radio link for Dual Connectivity operation, and where the method includes allocating the processing resources for the synchronous functions associated with each of the more than one radio link at the radio nodes providing the more than one radio link, and allocating the processing resources for the asynchronous functions associated with all of the one or more radio links in a common node.

3. The method of embodiment 2, further comprising, defining a common control point for the Dual Connectivity connection to the wireless communication apparatus at the common node, with respect to both user and control planes.

4. A method, in a network node, for splitting wireless communication functionality for a wireless communication apparatus, comprising:
sending signaling to one or more radio nodes to instantiate synchronous function processing to support radio links between the one or more radio nodes and the wireless communication apparatus;
sending signaling to one or more network nodes to instantiate asynchronous function processing supporting communications conducted over the one or more radio links.

5. The method of embodiment 4, wherein the synchronous functions are time sensitive with respect to a determined time window.

6. The method of embodiment 4, where there are two or more radio links corresponding to two or more Radio Access Technologies, RATs.

7. The method of embodiment 4, wherein determining comprises determining that functions of one network layer for the wireless communication apparatus are to be instantiated on the one or more radio nodes and functions of another network layer for the wireless communication apparatus are to be instantiated on the one or more network nodes.

10. The method of embodiment 1, further comprising obtaining network information comprising state information of radio nodes and function requirements of the wireless communication apparatus, and wherein the sending signaling is based on the network information.

11. The method of embodiment 1, further comprising determining that radio nodes closer to the wireless communication apparatus are to handle synchronous functions.

13. The method of embodiment 1, the wireless communication apparatus is configured to perform dual control plane connectivity.

14. The method of embodiment 1, wherein RLC, MAC and PHY functions form an SFG and RRC and PDPC form an SFG.

17. The method of embodiment 1, further comprising organizing synchronous functions of into synchronous pairs based on state information within a determined time window associated with the time-domain structure of the one or more radio nodes.

18. The method of embodiment 1, further comprising:
determining which functionalities should be RAT-specific or RAT-common in an integrated multi-RAT architecture; and
determining how these functions should be allocated among the one or more radio nodes and one or more network nodes.

19. A method, in a base station having processing resources allocable for instantiation of resource functions to support a radio link with a wireless communication apparatus, comprising:
receiving allocation signaling requesting a particular instantiation of synchronous functions for a wireless communication apparatus;
instantiating the synchronous functions in processing resources allocated at the base station; and
communicating with one or more other nodes that are handling asynchronous functions associated with communication services provided via the radio link.

21. The method of embodiment 19, further comprising:
handling asynchronous functions for the wireless communication apparatus; and communicating with two separate base stations that each handle synchronous functions for the wireless communication apparatus.

The invention claimed is:

1. A method of resource allocation for supporting communications with a wireless device, the method being performed in a network element of a wireless communication network, the method comprising:
differentiating between synchronous network functions and asynchronous network functions, the synchronous and asynchronous network functions being associated with providing communication services to the wireless device, said synchronous network functions having requirements on processing timing which are strictly dependent on timing of a radio link used for communicating with the wireless device, and said asynchronous network functions having requirements on processing timing not strictly dependent on the timing of the radio link; and
allocating resources of the wireless communication network for instantiation of a first network function based on whether the first network function is synchronous or asynchronous.

2. The method according to claim 1, further comprising:
obtaining information related to at least one of the following: a characteristic of the first network function; a relationship or dependency between the first network function and a further network function; available resources in entities of the wireless communication network; transmission resources between the entities of the wireless communication network; and the wireless device,
wherein the resources are allocated based also on the obtained information.

3. The method according to claim 1, wherein allocating the resources for the instantiation of the first network function comprises, when the first network function is synchronous:
allocating first resources resulting in latency for transmission and reception over the radio link which is below a threshold, thereby fulfilling the requirements on processing timing for the synchronous network functions.

4. The method according to claim 1, wherein allocating the resources for the instantiation of the first network function comprises, when the first network function is asynchronous:
allocating second resources that result in a higher latency for transmission and reception over the radio link than is allowed for the synchronous network functions.

5. The method according to claim 1, wherein the allocated resources comprise at least one of: processing resources, memory resources, and resources related to network interfaces.

6. The method according to claim 1, wherein resources are allocated further for instantiation of a second network function, based on whether the second network function is synchronous or asynchronous.

7. The method according to claim 6, wherein the first network function and the second network function respectively correspond to different protocol layers.

8. The method according to claim 6, wherein the first and second network functions both are synchronous and are grouped into a synchronous function group, wherein resources, resulting in a latency for transmission and reception over the radio link that is below a threshold, are allocated for the synchronous function group, and wherein the threshold corresponds to the requirements on processing timing for the synchronous network functions.

9. The method according to claim 1, further comprising:
sending information related to the instantiation of the first network function, the information being sent to at least one network entity of the wireless communication network associated with the allocated resources.

10. The method according to claim 1, wherein the allocation of the resources is triggered by a network event.

11. The method according to claim 1, wherein a first and a second radio link are used for communicating with the wireless device for dual connectivity operation, the method comprising when the first network function is asynchronous and associated with both the first and the second radio links:
allocating resources for the instantiation of the first network function such that at least partly the same resources can be utilized when the operation of the first network function is associated with the first radio link and when the operation of the first network function is associated with the second radio link.

12. The method of claim 1, wherein the first network function is synchronous, wherein allocating the resources for instantiating the first network function comprises allocating first resources at a first network node in the wireless communication network, for instantiating the first network function at the first network node, wherein the method further includes allocating second resources at a second network node in the wireless communication network, for instantiating a second network function that is asynchronous, and wherein said first and second network functions are cooperatively used for communicating with the wireless device.

13. The method of claim 12, wherein the first network function handles physical layer processing for the radio link, and wherein the second network function handles processing for one or more layers above the physical layer.

14. A network element for a wireless communication network, the network element being configured to allocate resources for supporting communications with a wireless device, the network element being further configured to:
differentiate between synchronous network functions and asynchronous network functions, the synchronous and asynchronous network functions being associated with providing communication services to the wireless device, said synchronous network functions having requirements on processing timing which are strictly dependent on timing of a radio link used for communicating with the wireless device, and said asynchronous network functions having requirements on processing timing not strictly dependent on the timing of the radio link; and
allocate resources of the wireless communication network for instantiation of a first network function based on whether the first network function is synchronous or asynchronous.

15. The network element according to claim 14, further configured to:
obtain information related to at least one of the following: a characteristic of the first network function; a relationship or dependency between the first network function and a further network function; available resources in entities of the wireless communication network; transmission resources between the entities of the wireless communication network; and the wireless device; and
allocate the resources for the instantiation of the first network function based also on the obtained information.

16. The network element according to claim 14, further configured to allocate the resources for the instantiation of the first network function by:
when the first network function is synchronous, allocating first resources resulting in latency for transmission and reception over the radio link which is below a threshold, thereby fulfilling the requirements on processing timing for the synchronous network functions.

17. The network element according to claim 14, further configured to allocate the resources for the instantiation of the first network function by:
when the first network function is asynchronous, allocating second resources that result in a higher latency for transmission and reception over the radio link than is allowed for the synchronous network functions.

18. The network element according to claim 14, wherein the allocated resources comprise at least one of: processing resources, memory resources, and resources related to network interfaces.

19. The network element according to claim 14, configured to allocate resources further for instantiation of a second network function, based on whether the second network function is synchronous or asynchronous.

20. The network element according to claim 19, wherein the first network function and the second network function respectively correspond to different protocol layers.

21. The network element according to claim 19, wherein the first and second network functions both are synchronous and are grouped into a synchronous function group, the network element being further configured to allocate resources for the synchronous function group that results in a latency for transmission and reception over the radio link that is below a threshold corresponding to the requirements on processing timing for the synchronous network functions.

22. The network element according to claim 14, further configured to:
send information related to the instantiation of the first network function, the information being sent to at least one network entity of the wireless communication network associated with the allocated resources.

23. The network element according to claim 14, configured to allocate the resources triggered by a network event.

24. The network element according to claim 14, wherein a first and a second radio link are used for communicating with the wireless device for dual connectivity operation, and wherein the first network function is asynchronous and associated with both the first and the second radio links, the network element being configured to:
allocate resources for the instantiation of the first network function such that at least partly the same resources can be utilized when the operation of the first network function is associated with the first radio link and when the operation of the first network function is associated with the second radio link.

25. A non-transitory computer-readable medium storing a computer program comprising computer program instructions that, when executed by processing circuitry of a network element configured for operation in a wireless communication network and to support communications with a wireless device, configure the network element to:
differentiate between synchronous network functions and asynchronous network functions, the synchronous and asynchronous network functions being associated with providing communication services to the wireless device, said synchronous network functions having requirements on processing timing which are strictly dependent on timing of a radio link used for communicating with the wireless device, and said asynchronous network functions having requirements on processing timing not strictly dependent on the timing of the radio link; and allocate resources of the wireless communication network for instantiation of a first network function based on whether the first network function is synchronous or asynchronous.

26. A method of resource allocation in a wireless communication network, for supporting communications with a wireless communication apparatus, said method comprising:

differentiating between synchronous functions and asynchronous functions associated with providing communication services to the wireless communication apparatus, said synchronous functions having processing timings strictly dependent on timings of one or more radio links used for communicating with the wireless communication apparatus, and said asynchronous functions having processing timings not strictly dependent on the timings of the one or more radio links; and allocating resources for the synchronous functions according to an allocation scheme that restricts allocation of processing resources for the synchronous functions to a radio node or nodes used to provide the one or more radio links, and that does not restrict allocation of processing resources for the asynchronous functions to the radio node or nodes.

* * * * *